United States Patent
Unno et al.

(10) Patent No.: US 12,405,544 B2
(45) Date of Patent: Sep. 2, 2025

(54) TONER AND METHOD FOR PRODUCING TONER

(71) Applicant: CANON KABUSHIKI KAISHA, Tokyo (JP)

(72) Inventors: Tomohiro Unno, Shizuoka (JP); Dai Nozaki, Shizuoka (JP); Yoshitaka Suzumura, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 689 days.

(21) Appl. No.: 17/659,273

(22) Filed: Apr. 14, 2022

(65) Prior Publication Data

US 2022/0365457 A1 Nov. 17, 2022

(30) Foreign Application Priority Data

Apr. 21, 2021 (JP) .................. 2021-071560

(51) Int. Cl.
  *G03G 9/093* (2006.01)
  *G03G 9/08* (2006.01)

(52) U.S. Cl.
  CPC ....... *G03G 9/09328* (2013.01); *G03G 9/0821* (2013.01); *G03G 9/0823* (2013.01); *G03G 9/0825* (2013.01); *G03G 9/09364* (2013.01)

(58) Field of Classification Search
  None
  See application file for complete search history.

(56) References Cited

U.S. PATENT DOCUMENTS 5,324,612 A * 6/1994 Maeda ............... G03G 9/08755
                                                                 430/111.4
7,811,734 B2  10/2010 Ogawa et al.
(Continued)

FOREIGN PATENT DOCUMENTS

JP  2013-203857 A  10/2013
JP  2017-120394 A  7/2014
(Continued)

OTHER PUBLICATIONS

JP-2017044982-A Translation (Year: 2024).*
(Continued)

*Primary Examiner* — Mark F. Huff
*Assistant Examiner* — Charles Collins Sullivan, IV
(74) *Attorney, Agent, or Firm* — VENABLE LLP

(57) ABSTRACT

A toner and a method for producing the toner, wherein; the toner comprising a toner particle comprising a polyester resin, and has a softening point of 150° C. or less; the toner particle has the polyester resin within 100 nm from a surface of the toner particle, and where a value obtained by dividing an amount of counted ions for a structure represented by following formula (A) measured from the surface of the toner particle to a depth of 100 nm by TOF-SIMS by a total amount of counted ions is taken as a standard value, one or more peaks of the standard value are present within a range of 100 nm from the surface of the toner particle, and where A(dmax) denotes a standard value at a maximum peak and A(0) denotes a standard value on the toner particle surface, formula $1.15 \leq A(dmax)/A(0) \leq 5.00$ is satisfied.

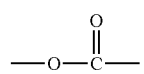

(A)

9 Claims, 6 Drawing Sheets

(56) References Cited

U.S. PATENT DOCUMENTS

| | | |
|---|---|---|
| 8,227,162 B2 | 7/2012 | Sano et al. |
| 8,426,094 B2 | 4/2013 | Magome et al. |
| 8,614,044 B2 | 12/2013 | Matsui et al. |
| 8,778,585 B2 | 7/2014 | Matsui et al. |
| 8,918,035 B2 | 12/2014 | Hasegawa et al. |
| 9,029,055 B2 | 5/2015 | Aoki et al. |
| 9,213,250 B2 | 12/2015 | Nomura et al. |
| 9,239,528 B2 | 1/2016 | Hasegawa et al. |
| 9,244,371 B2 | 1/2016 | Suzumura et al. |
| 9,417,542 B2 | 8/2016 | Hiroko et al. |
| 9,625,841 B2 | 4/2017 | Hiroko et al. |
| 9,658,549 B2 | 5/2017 | Tanaka et al. |
| 9,804,514 B2 | 10/2017 | Suzumura et al. |
| 9,804,519 B2 | 10/2017 | Suzumura et al. |
| 9,841,692 B2 | 12/2017 | Hasegawa et al. |
| 9,880,478 B2 | 1/2018 | Shimano et al. |
| 9,927,728 B2 | 3/2018 | Arimura et al. |
| 9,946,179 B2 | 4/2018 | Arimura et al. |
| 9,946,181 B2 | 4/2018 | Hasegawa et al. |
| 9,964,874 B2 | 5/2018 | Suzumura et al. |
| 9,964,881 B2 | 5/2018 | Ikejiri et al. |
| 9,971,262 B2 | 5/2018 | Hasegawa et al. |
| 9,971,264 B2 | 5/2018 | Sano et al. |
| 10,012,923 B2 | 7/2018 | Sano et al. |
| 10,228,627 B2 | 3/2019 | Nagashima et al. |
| 10,310,397 B2 | 6/2019 | Sano et al. |
| 10,545,420 B2 | 1/2020 | Kinumatsu et al. |
| 10,698,327 B2 | 6/2020 | Nagashima et al. |
| 10,747,136 B2 | 8/2020 | Kenmoku et al. |
| 11,181,839 B2 | 11/2021 | Yamashita et al. |
| 11,181,840 B2 | 11/2021 | Nagata et al. |
| 11,181,846 B2 | 11/2021 | Kinumatsu et al. |
| 11,333,989 B2 | 5/2022 | Unno et al. |
| 2007/0111128 A1* | 5/2007 | Patel .............. G03G 9/0806 430/108.4 |
| 2009/0197192 A1 | 8/2009 | Hiroko et al. |
| 2016/0378003 A1 | 12/2016 | Arimura et al. |
| 2017/0160661 A1 | 6/2017 | Suzumura |
| 2017/0160662 A1* | 6/2017 | Nagashima ........ G03G 9/08782 |
| 2017/0336727 A1 | 11/2017 | Ikejiri |
| 2021/0080846 A1 | 3/2021 | Mizuguchi et al. |
| 2021/0356878 A1 | 11/2021 | Mizuguchi et al. |
| 2022/0146952 A1 | 5/2022 | Komiya et al. |
| 2022/0146955 A1 | 5/2022 | Nozaki et al. |
| 2022/0171301 A1 | 6/2022 | Suzumura et al. |

FOREIGN PATENT DOCUMENTS

| | | | |
|---|---|---|---|
| JP | 2016-142758 A | | 8/2016 |
| JP | 2016-142760 A | | 8/2016 |
| JP | 2017-44982 A | | 3/2017 |
| JP | 2017044982 A | * | 3/2017 |
| JP | 2017-107169 A | | 6/2017 |
| JP | 2017-207680 A | | 11/2017 |
| JP | 2017-211648 A | | 11/2017 |
| JP | 2019-168529 A | | 10/2019 |

OTHER PUBLICATIONS

U.S. Appl. No. 17/808,835, filed Jun. 24, 2022, Dai Nozaki.
U.S. Appl. No. 17/812,536, filed Jul. 14, 2022, Yoshitaka Suzumura.

* cited by examiner

TONER AND METHOD FOR PRODUCING TONER

BACKGROUND OF THE INVENTION

Field of the Invention

The present disclosure relates to a toner for use in an electrophotographic method and to a method for producing the toner.

Description of the Related Art

In recent years, further energy saving is required for electrophotographic image forming apparatuses such as copiers and printers. Accordingly, with regard to toners, the development of toners that can be fixed at a lower temperature has been advanced. Japanese Patent Application Publication No. 2017-211648 discloses a toner, the viscoelastic characteristic of which is controlled by using a crystalline polyester. It is indicated in Japanese Patent Application Publication No. 2017-211648 that this toner makes it possible to suppress the so-called cold offset, that is, a process in which when a toner passes through a fixing nip in a state where the toner is not sufficiently melted, the toner adheres to a fixing film and is fixed on paper after an operation cycle is performed in this state. It is also indicated that the viscoelastic characteristic is easily controlled by dispersing such a crystalline material as fine domains in the toner. Japanese Patent Application Publication No. 2017-207680 discloses a toner that is excellent in sharp melt property and has both low-temperature fixability and high-temperature storage stability as a result of performing domain control using a crystalline polyester and melting point wax in the toner.

Toners including a polyester resin as a material imparting functionality to the toner have been often used from the viewpoint of versatility of resin design. For example, Japanese Patent Application Publication No. 2017-044982 and Japanese Patent Application Publication No. 2016-142758 indicate that, for example, in a toner using a polyester resin as a surface layer, an effect of improving charging performance is exerted by controlling the amount, composition, polarity, acid value, and the like of the polyester resin.

SUMMARY OF THE INVENTION

However, as the demand for energy saving is becoming stronger, further improvement in low-temperature fixability of the toners described in Japanese Patent Application Publication No. 2017-211648, Japanese Patent Application Publication No. 2017-207680, Japanese Patent Application Publication No. 2017-044982, and Japanese Patent Application Publication No. 2016-142758 is required.

The present disclosure provides a toner that has excellent low-temperature fixability and enables energy saving, increase in speed, and improvement in image quality, and also a method for producing the toner.

The present invention relates to a toner comprising a toner particle comprising a polyester resin, wherein
    the toner has a softening point determined by a constant-load extrusion type capillary rheometer of 150° C. or less,
    the toner particle comprises the polyester resin within 100 nm from a surface of the toner particle,
    where a value obtained by dividing an amount of counted ions for a structure represented by following formula (A) measured from the surface of the toner particle to a depth of 100 nm by time-of-flight secondary ion mass spectrometry by a total amount of counted ions is taken as a standard value,
    one or more peaks of the standard value are present within a range of 100 nm from the surface of the toner particle, where a standard value of a peak having a maximum standard value among the one or more present peaks is denoted by A(dmax) and the standard value on the toner particle surface is denoted by A(0), the A(dmax) and the A(0) satisfy following formulas (1) and (2):

$$1.15 \leq A(d\text{max})/A(0) \leq 5.00 \tag{1}$$

$$0.010 \leq A(0) \tag{2}$$

(A)

The present invention relates to a method for producing a toner, the method comprising:
    a step of obtaining resin particles comprising a polyester resin;
    a dispersion step of obtaining a suspension in which the obtained resin particles are dispersed in an aqueous medium;
    a treatment step of treating the suspension at pH(1) at 95° C. or higher and then treating at pH(2);
    a cooling step of cooling the suspension treated in the treatment step at a cooling rate of 50° C./min or more, wherein
    the pH(1) and the pH(2) satisfy following formulas (10) and (11):

$$\text{pH}(1) < \text{pH}(2) \tag{10}$$

$$6.0 \leq \text{pH}(2) \leq 10.5 \tag{11}.$$

The present disclosure can provide a toner that has excellent low-temperature fixability and enables energy saving, increase in speed, and improvement in image quality, and also a method for producing the toner.

Further features of the present invention will become apparent from the following description of exemplary embodiments with reference to the attached drawings.

DESCRIPTION OF THE EMBODIMENTS

Figure 1:
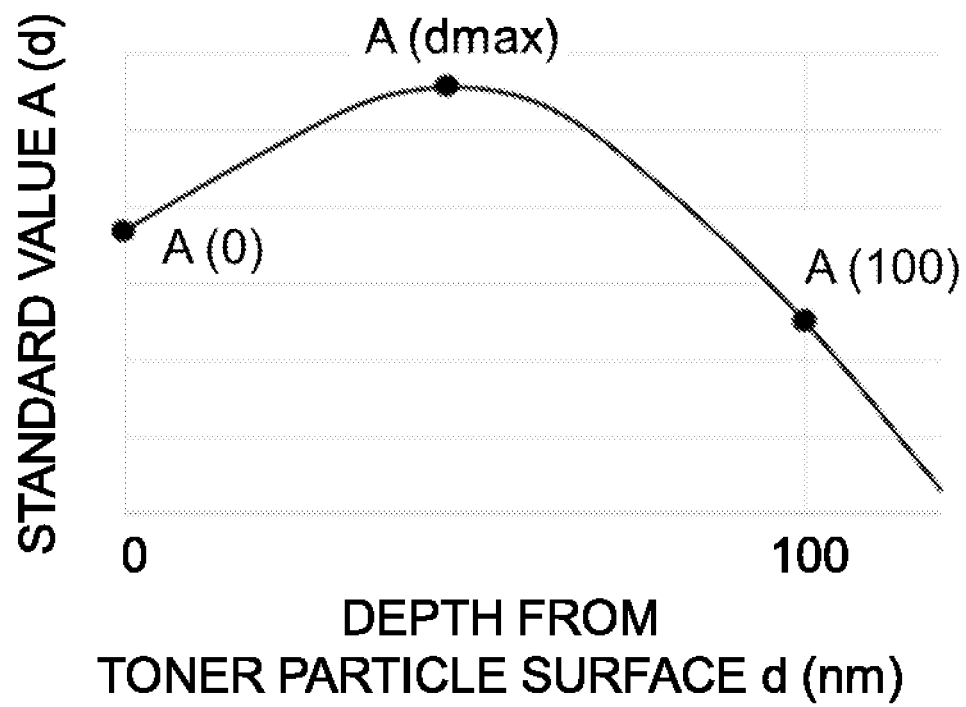
FIG. 1 is a schematic diagram of results of measuring the amount of ions from the surface of a toner particle to a depth of 100 nm by time-of-flight secondary ion mass spectrometry.
Figure 2A:
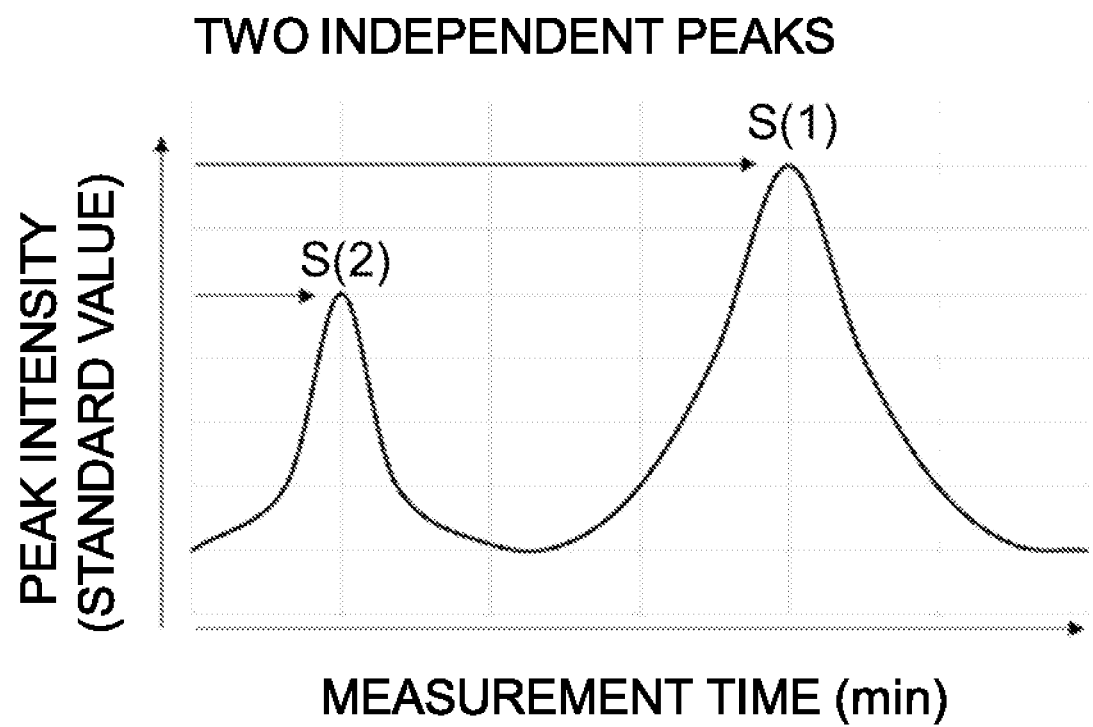
FIGS. 2A to 2C are schematic diagrams of results of gradient polymer elution chromatography analysis of eluted components when acetonitrile is used as a poor solvent and chloroform is used as a good solvent with respect to a chloroform-soluble component of a polyester resin, with FIG. 2A showing two single peaks, FIG. 2B showing two overlapping peaks, and FIG. 2C showing one peak.
Figure 2B:
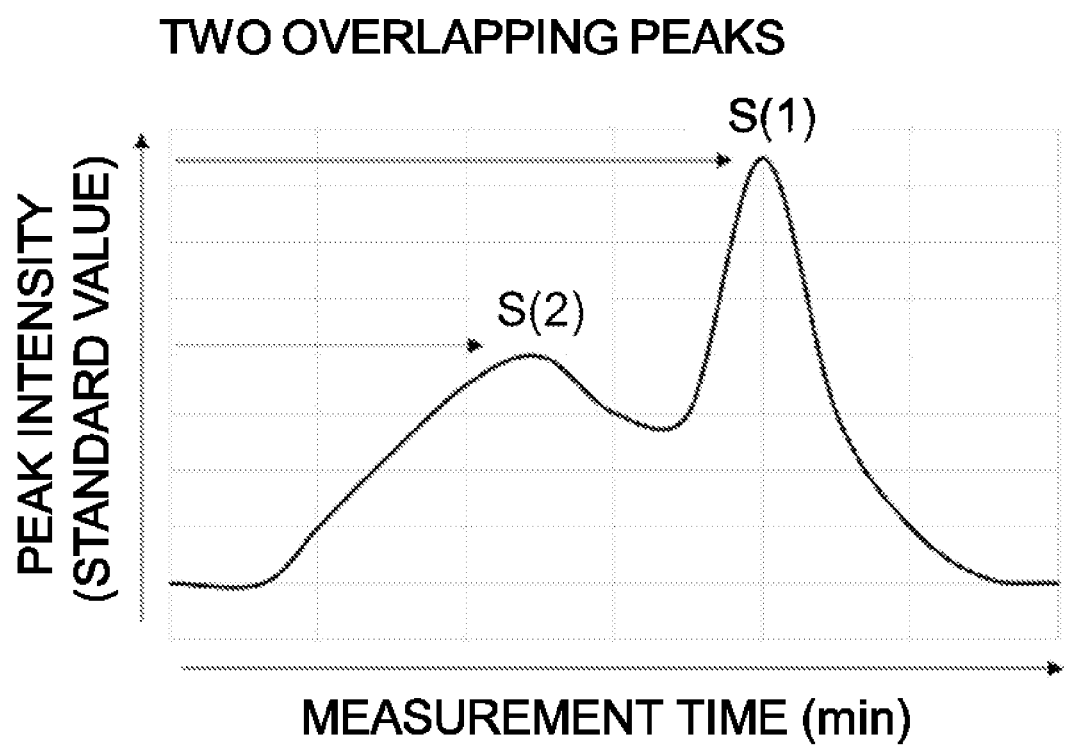
Figure 2C:
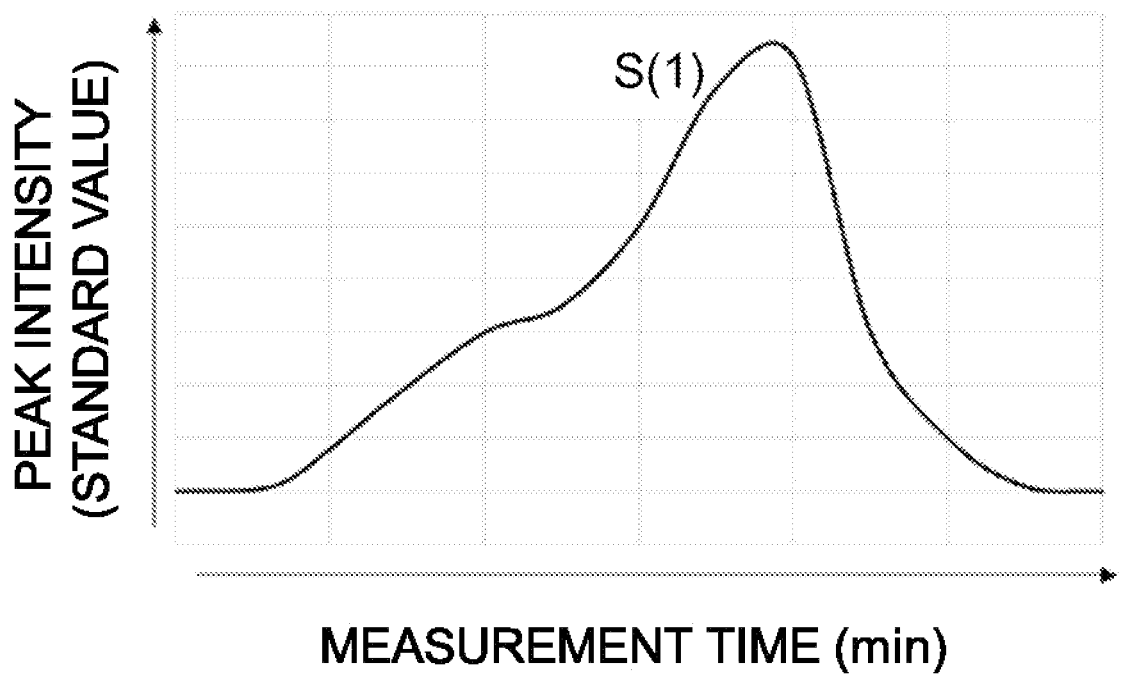
Figure 3:
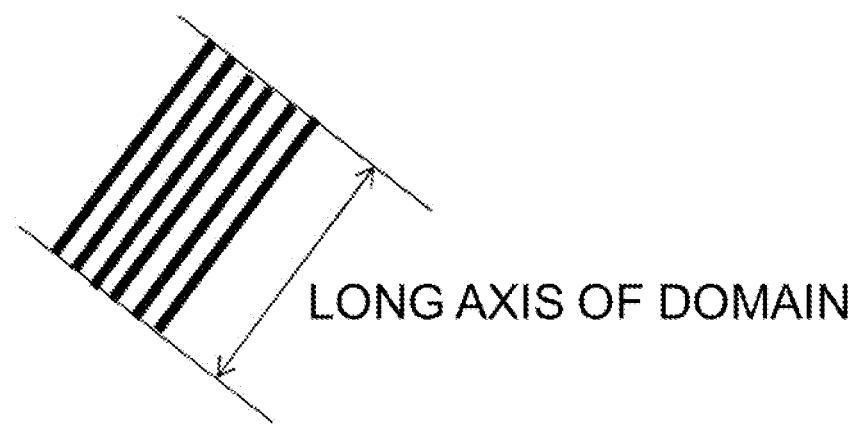
FIG. 3 is a schematic diagram showing the shape of a domain.

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined.

The "monomer unit" refers to the reacted form of a monomer substance in a polymer. For example, one carbon-carbon bond section in the main chain in the polymer in which the polymerizable monomer has been polymerized is defined as one unit.

The polymerizable monomer can be represented by the following formula (C).

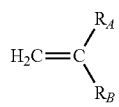
(C)

In the formula (C), $R_A$ represents a hydrogen atom or an alkyl group (preferably an alkyl group having from 1 to 3 carbon atoms, and more preferably a methyl group), and $R_B$ represents an arbitrary substituent.

The (meth)acrylic acid ester means an acrylic acid ester and/or a methacrylic acid ester. The crystalline resin refers to a resin that shows a clear endothermic peak in differential scanning calorimetry (DSC) measurement.

As a result of diligent studies by the present inventors, it was found that by controlling the orientation state of the molecular chain of the polyester resin in the toner particle, excellent low-temperature fixability is provided and energy saving, increase in speed, and improvement in image quality can be realized.

The toner of the present invention is a toner comprising a toner particle comprising a polyester resin, wherein
  the toner has a softening point determined by a constant-load extrusion type capillary rheometer of 150° C. or less,
  the toner particle comprises the polyester resin within 100 nm from a surface of the toner particle,
  where a value obtained by dividing an amount of counted ions for a structure represented by following formula (A) measured from the surface of the toner particle to a depth of 100 nm by time-of-flight secondary ion mass spectrometry by a total amount of counted ions is taken as a standard value,
  one or more peaks of the standard value are present within a range of 100 nm from the surface of the toner particle,
  where a standard value of a peak having a maximum standard value among the one or more present peaks is denoted by A(dmax) and the standard value on the toner particle surface is denoted by A(0), the A(dmax) and the A(0) satisfy following formulas (1) and (2):

$$1.15 \leq A(d\text{max})/A(0) \leq 5.00 \quad (1)$$

$$0.010 \leq A(0) \quad (2)$$

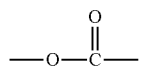
(A)

In a toner having a polyester resin near the surface of a toner particle, the structure represented by the formula (A) in the conventional polyester resin is present in random orientation and, therefore, difficult to control. However, the present inventors have succeeded in controlling the orientation state of the structure represented by the formula (A) by diligently studying the monomer composition, monomer ratio, molecular weight, and the like in the polyester resin.

Specifically, the attention was focused on the polarity and composition distribution in the structure of the polyester resin, and for the first time, it has become possible to control the orientation state of the structure represented by the formula (A) by unevenly distributing highly polar segments such as the structure represented by the formula (A) that is contained in the carboxylic acid segment at the end of the polyester resin, and using the difference in bulk height between the segments having different composition distributions such as described hereinbelow. As a result, a toner that has excellent low-temperature fixability and enables energy saving, increase in speed, and improvement in image quality was obtained.

In the toner of the present disclosure, where a value obtained by measuring an amount of ions measured from the surface of the toner particle to a depth of 100 nm by time-of-flight secondary ion mass spectrometry (TOF-SIMS) and dividing the counted amount of ions of the structure represented by the formula (A) by a total amount of counted ions is taken as a standard value, one or more peaks of the standard value are present within a range of 100 nm from the surface of the toner particle. This is a precondition for controlling the presence state of the structure represented by the formula (A) near the surface to the range of the present disclosure, and it indicates that the toner particle of the present disclosure has the polyester resin within 100 nm from the surface of the toner particle.

The number of peaks of the standard value is preferably 1 to 2, and more preferably 1.

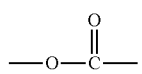
(A)

In the time-of-flight secondary ion mass spectrometry method, it is possible to detect elements and molecular species near the sample surface with high sensitivity as will be described hereinbelow in details.

The structure represented by the formula (A) is a part of the molecular structure mainly contained in the ester bond segment and the terminal carboxylic acid segment of the polyester resin.

Further, among one or more peaks of the standard value that are present when the amount of ions is measured from the surface of the toner particles to a depth of 100 nm by TOF-SIMS, where the standard value of the peak with the maximum standard value among the one or more peaks that are present is denoted by A(dmax) and the standard value on the surface of the toner particle is denoted by A(0), the A(dmax) and the A(0) satisfy the following formulas (1) and (2).

$$1.15 \leq A(d\text{max})/A(0) \leq 5.00 \quad (1)$$

$$0.010 \leq A(0) \quad (2)$$

The formula (1) shows that the structure represented by the formula (A) is unevenly distributed in a region deeper than the surface of the toner particle and within 100 nm from the surface of the toner particle. By satisfying the formula (1), the adhesion between the toner particles at the time of fixing the toner can be improved. This is conceivably because when the toner surface in a state where the structure represented by the formula (A) is unevenly distributed receives heat or pressure during the fixing process, the unevenly distributed state tries to change rapidly to a uniform presence state, thereby promoting the deformation of the toner which leads to the improvement of adhesion between the toner particles.

The formula (2) indicates that the abundance of the structure represented by the formula (A) on the surface of the toner particle (that is, a depth of 0 nm from the surface of the toner particle) is at or above a certain level. By satisfying the formulas (1) and (2) at the same time, the adhesion between the toner and the paper as a medium can be improved. This is conceivably because, in addition to the aforementioned promotion of toner deformation, the affinity of cellulose, which is the main component of paper, with the structure represented by the formula (A) is high, so that the abundance of the structure represented by the formula (A) on the outermost surface of the toner particle is at or above a certain level, whereby the rate of wetting and spreading on the paper near the toner surface increases when the toner melts which leads to improved adhesion between the toner and the paper.

When $A(d\max)/A(0)$ is 1.15 or more in the formula (1), the adhesion between the toner particles is sufficient. When $A(d\max)/A(0)$ is 5.00 or less, the orientation of the structure represented by the formula (A) can be controlled without using or co-using a polyester resin having extremely high or low physical properties such as molecular weight and acid value. Further, adverse effects such as uneven concentration after fixing due to toner scattering, which is caused by broadening of charge distribution on the surface of the toner particle resulting from excessive uneven distribution of the structure represented by the formula (A), that is, the polyester resin, in the toner can be suppressed. $A(d\max)/A(0)$ is preferably 1.20 to 5.00, and more preferably 1.30 to 3.00. $A(d\max)$ and $A(0)$ can be controlled by selecting the type and amount of the monomers so that the polyester resin has a specific composition distribution.

Further, when $A(0)$ is 0.010 or more in the formula (2), the effect of improving the adhesion between the toner and the paper can be sufficiently obtained. In a toner including the polyester resin within 100 nm from the surface of the toner particle, a certain amount of the structure represented by the formula (A) is necessarily present at a depth of 0 nm from the surface of the toner particle, that is, on the surface of the toner particle. Therefore, it is difficult to produce and control a toner having $A(0)$ of less than 0.010.

The present inventors presume that the following mechanism enables uneven distribution of the structure represented by the formula (A) near the surface of the toner particle. It is conceivable that by designing a polyester resin that has a specific composition distribution in consideration of the presence state of the structure represented by the formula (A) in the polyester resin, such that non-polar groups and polar groups are unevenly distributed in the polyester resin molecule, it is possible to control the presence state of the structure represented by the formula (A) in the polyester resin.

As a specific method, for example, ester bond segments having different composition distributions can be arranged near the surface of the toner particle by aligning the orientation state of carboxylic acid groups at the ends of the polymer in the polyester resin molecule, or by using in combination a polymer with a composition having a significantly different polar distribution. Further, for example, in a resin particle including a polyester resin having the structure represented by the formula (A), the structure represented by the formula (A) (ester bond segment) in the polyester resin can be more easily transferred to the surface of the toner particle by treating the resin particle at a pH and heat above a certain level in an aqueous medium, or by modifying the resin particle surface with heat in a dry powder state. Further, it is considered that where two or more resins having different composition distributions are used in combination as the polyester resin including the structure represented by the formula (A), a difference in bulkiness occurs and a steric hindrance is created between the two or more polyester resins near the outermost surface of the toner particle, so that the structure represented by the formula (A) can be precisely unevenly distributed not in the outermost surface of the toner particle but in a region within 100 nm in depth from the surface of the toner particle.

A preferable form, a preferable material composition, and a preferable production method will be described hereinbelow with respect to the toner of the present disclosure.

Toner

Where a standard value at a depth of 100 nm from the surface of the toner particle, from among the standard values when the toner particle is analyzed by TOF-SIMS, is denoted by $A(100)$, in order to control the structure represented by the formula (A) to the uneven distribution state as described above, it is preferable that the $A(d\max)$ and $A(100)$ satisfy the following formula (3).

$$1.15 \leq A(d\max)/A(100) \leq 5.00 \quad (3)$$

The formula (3) indicates that the structure represented by the formula (A) is unevenly distributed in a region shallower than the position of 100 nm or less from the surface of the toner particle and within 100 nm from the surface of the toner particle. By satisfying the formula (3), it is possible to further suppress the scattering of toner and obtain an image with less density unevenness. $A(d\max)/A(100)$ is more preferably 1.50 to 3.00. $A(100)$ can be controlled by selecting the type and amount of the monomers so that the polyester resin has a specific composition distribution, or by changing the addition amount of the polyester resin.

Further, it is preferable that the $A(0)$ satisfy a following formula (4).

$$0.010 \leq A(0) \leq 0.100 \quad (4)$$

Where $A(0)$ is 0.010 or more, the abovementioned effect of improving the adhesion between the toner and paper is more preferably exhibited, and where $A(0)$ is 0.100 or less, the amount of the structure represented by the formula (A) present in the toner particle does not become excessive, so that the effect of promoting the deformation of toner can be easily obtained. $A(0)$ is more preferably 0.010 to 0.080.

It is preferable that the $A(100)$ satisfies a following formula (5).

$$0.010 \leq A(100) \leq 0.100 \quad (5)$$

By satisfying the formula (5), it is easy to control the presence state of the structure represented by the formula (A) within 100 nm from the surface of the toner particle, and when the toner particle has a core-shell structure, the thickness of the shell is easy to control to 100 nm to 200 nm. $A(100)$ is more preferably 0.010 to 0.080.

The softening point of the toner determined by a constant-load extrusion type capillary rheometer is 150° C. or less.

The details of the measurement method used with the constant-load extrusion type capillary rheometer will be described hereinbelow, but the meltability of the compression-molded sample with respect to heat can be observed. The softening point is an index of the meltability, and it is considered that the lower the softening point, the easier it is for the toner to melt at a lower temperature. In order to obtain low-temperature fixability, it is necessary that the structure represented by the formula (A), which is unevenly distributed near the surface of the toner particle, assume an easily movable state due to melting near the surface of the toner particle, and when the softening point is 150° C. or lower, sufficient meltability is obtained. The softening point is preferably 140° C. or lower, and more preferably 130° C. or lower. The lower limit of the softening point is not particularly restricted, and may be, for example, 100° C. or higher. The softening point can be controlled by the composition design of the polyester resin or the binder resin and the amount of the crystalline material.

Polyester Resin

The toner includes a toner particle having a polyester resin. The polyester resin may be used as a binder resin described hereinbelow or may be used as a component other than the binder resin. When the toner particle has a core-shell structure described hereinbelow, the shell may include the polyester resin, and the core may also include the polyester resin.

The amount of the polyester resin in the toner particle is preferably 1.0% by mass to 95.0% by mass. When, in addition to the polyester resin, the toner particle includes a binder resin described hereinbelow, the amount of the polyester resin in the toner particle is more preferably 1.0% by mass to 30.0% by mass. When the toner particle includes the polyester resin as the binder resin, the amount of the polyester resin in the toner particle is more preferably 50.0% by mass to 95.0% by mass.

The polyester resin is not particularly limited, and a known polyester resin can be used, but an amorphous polyester resin is preferable.

The material composition of the polyester resin is not particularly limited, and known materials can be used. Examples of the monomers include a dihydric alcohol monomer component and a divalent acid monomer component.

Examples of the divalent acid monomer component include the following dicarboxylic acids and derivatives thereof. Benzenedicarboxylic acids such as phthalic acid, terephthalic acid, isophthalic acid, phthalic anhydride, and the like, and anhydrides or lower alkyl esters thereof, alkyldicarboxylic acids such as succinic acid, adipic acid, sebacic acid, azelaic acid, and the like, and anhydrides or lower alkyl esters thereof, alkenyl succinic acids or alkyl succinic acids such as n-dodecenyl succinic acid, n-dodecyl succinic acid, and the like, and anhydrides or lower alkyl esters thereof, and unsaturated dicarboxylic acids such as fumaric acid, maleic acid, citraconic acid, itaconic acid, and the like, and anhydrides or lower alkyl esters thereof. The divalent acid monomer components may be used alone or in combination of two or more.

Examples of the dihydric alcohol monomer component include the following. Ethylene glycol, polyethylene glycol, 1,2-propanediol, 1,3-propanediol, 1,6-hexanediol, neopentyl glycol, 1,4-cyclohexanedimethanol (CHDM), isosorbide, hydrogenated bisphenol A, and bisphenol and derivatives thereof. The divalent alcohol monomer components may be used alone or in combination of two or more.

In addition to the abovementioned divalent acid monomer component and dihydric alcohol monomer component, the polyester resin may include an acid monomer component such as a monovalent carboxylic acid compound, a trivalent or higher carboxylic acid compound, and the like and an alcohol monomer component such as a monohydric alcohol compound, a trihydric or higher alcohol compound, and the like.

Examples of the monovalent carboxylic acid compound include aromatic carboxylic acids having 30 or less carbon atoms such as benzoic acid, p-methylbenzoic acid, and the like, aliphatic carboxylic acids having 30 or less carbon atoms such as stearic acid, behenic acid, and the like.

Examples of the monohydric alcohol compound include aromatic alcohols having 30 or less carbon atoms such as benzyl alcohol and the like, aliphatic alcohols having 30 or less carbon atoms such as lauryl alcohol, cetyl alcohol, stearyl alcohol, behenyl alcohol, and the like.

The trivalent or higher carboxylic acid compound is not particularly limited, and examples thereof include trimellitic acid, trimellitic anhydride, pyromellitic acid, and the like.

Examples of the trihydric or higher alcohol compound include trimethylolpropane, pentaerythritol, glycerin, and the like.

The acid monomer component and the alcohol monomer component can be used alone or in combination of two or more.

The content ratio of the monomer unit represented by the following formula (B) in the polyester resin is preferably from 30.0% by mass to 50.0% by mass (more preferably 40.0% by mass to 50.0% by mass) with respect to the mass of the polyester resin;

the content ratio of the monomer unit represented by the following formula (C) in the polyester resin is preferably from 25.0% by mass to 50.0% by mass (more preferably 25.0% by mass to 40.0% by mass) with respect to the mass of the polyester resin; and the content ratio of the monomer unit represented by the following formula (D) in the polyester resin is preferably from 1.0% by mass to 50.0% by mass (more preferably 20.0% by mass to 30.0% by mass) with respect to the mass of the polyester resin.

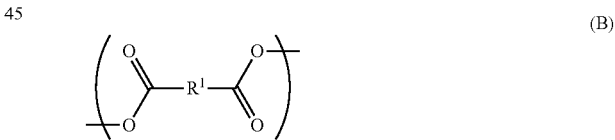

(B)

(In the formula (B), $R^1$ represents a benzene ring.)

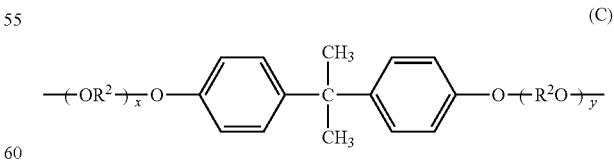

(C)

(In the formula (C), $R^2$ represents an ethylene group or a propylene group, x and y are each an integer of 1 or more, and the average value of x+y in the polyester resin is 2 to 10).

(D)

(In formula (D), $R^3$ represents an ethylene group or a propylene group.)

Further, it is preferable that the value of the dielectric loss tangent of the polyester resin at 25° C. and 10,000 Hz be from 0.0070 to 0.0140. The value of the dielectric loss tangent can be controlled by changing the material composition of the polyester resin, but it can be preferably controlled by including a monomer unit represented by a following formula (E) in the polyester resin.

That is, it is preferable that the polyester resin include the monomer unit represented by the following formula (E), and it is more preferable that the content ratio of the monomer unit represented by the following formula (E) in the polyester resin be from 1.0% by mass to 5.0% by mass (more preferably 2.0% by mass to 4.0% by mass) with respect to the mass of the polyester resin.

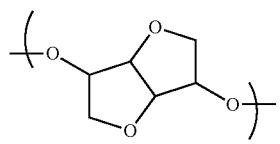

(E)

Further, when acetonitrile is used as a poor solvent and chloroform is used as a good solvent for a chloroform-soluble component of the polyester resin, and a component eluted during a linear change from a mobile phase composition of 100% by mass of acetonitrile to a mobile phase composition of 100% by mass of chloroform is analyzed by gradient polymer elution chromatography, two or more peaks are obtained, and where a value obtained by normalizing the peak top value of the maximum peak (the standard value of the peak showing the maximum peak intensity) among the two or more peaks is denoted by S(1) and a value obtained by normalizing the peak top value of the second largest peak (the standard value of the peak showing the second largest peak intensity) is denoted by S(2), the S(1) and S(2) preferably satisfy the following formula (6).

$$0.40 \leq S(2)/S(1) < 1.00 \tag{6}$$

Although the detailed measurement method will be described hereinbelow, the gradient polymer elution chromatography (GPEC) analysis is an analysis method in which polar polymers can be separated by columns depending on the height of polarity. Formula (6) indicates that the polyester resin has segments of different polarity, that is, has a composition distribution.

The composition distribution makes it easy to unevenly distribute in the toner the presence state of the structure represented by the formula (A) contained in the polyester resin.

In GPEC measurement, the peak appears at a position farther away as the polarity increases. Therefore, two or more peaks may overlap, but it is preferable that the peak having S(1) and the peak having S(2) be independent. That is, in the polyester resin, it is preferable that a polar portion and a non-polar portion be present while maintaining a certain distance. By unevenly distributing the polar portion and the non-polar portion in this way, the uneven distribution of the structure represented by the formula (A) is likely to occur in the polyester resin.

Where S(2)/S(1) is 0.40 or more, the peak having S(1) and the peak having S(2) are likely to appear independently of each other. It is more preferable that S(2)/S(1) be 0.50 to 0.80. S(2)/S(1) can be controlled by changing the composition of the monomers constituting the polyester resin.

The weight average molecular weight (Mw) of the polyester resin is preferably 9000 to 15,000, and more preferably 10,000 to 13,000. The acid value of the polyester resin is preferably 4.0 mg KOH/g to 10.0 mg KOH/g, and more preferably 4.5 mg KOH/g to 8.0 mg KOH/g.

A method for producing the polyester resin is not particularly limited, and a known method can be used.

Binder Resin

The toner particle preferably comprises a binder resin. The amount of the binder resin in the toner particle is preferably 50.0% by mass to 95.0% by mass.

The binder resin is not particularly limited, and the polyester resin of the present disclosure can be also used as the binder resin. Other examples of the binder resin include the following resins.

Vinyl resins using polymerizable monomers, polyester resins other than the polyester resin of the present disclosure, polyol resins, polyvinyl chloride resins, phenol resins, phenol resins modified with natural resins, maleic acid resins modified with natural resins, acrylic resins, methacrylic resins, polyvinyl acetate, silicone resins, polyurethane resins, polyamide resins, furan resins, epoxy resins, xylene resins, polyvinyl butyral, terpene resins, coumarone-indene resins, and petroleum resins.

A vinyl resin such as a styrene-acrylic resin, a polyester resin (including any of the polyester resin of the present disclosure and a polyester resin other than the polyester resin of the present disclosure), and a hybrid resin obtained by mixing a polyester resin and a vinyl resin or by partially reacting the two are preferable, and a styrene-acrylic resin and the polyester resin of the present disclosure are more preferable. These binder resins may be used alone or in combination of two or more.

Polymerizable Monomer

As the polymerizable monomer capable of producing the binder resin, for example, a vinyl monomer capable of radical polymerization is used. As the vinyl monomer, a monofunctional monomer and a polyfunctional monomer can be used.

Examples of the monofunctional monomer include styrene; styrene derivatives such as α-methylstyrene, β-methylstyrene, o-methylstyrene, m-methylstyrene, p-methylstyrene, p-methoxystyrene, p-phenylstyrene, and the like; acrylic polymerizable monomers such as methyl acrylate, ethyl acrylate, n-propyl acrylate, iso-propyl acrylate, n-butyl acrylate, dibutyl phosphate ethyl acrylate, 2-benzoyloxy-ethyl acrylate, and the like; methacrylic polymerizable monomers such as methyl methacrylate, ethyl methacrylate, dibutyl phosphate ethyl methacrylate, and the like; methylene aliphatic monocarboxylic acid esters; vinyl esters such as vinyl acetate, vinyl propionate, and the like; vinyl ethers such as vinyl methyl ether, vinyl ethyl ether, vinyl isobutyl ether, and the like; and vinyl ketones such as vinyl methyl ketone, vinyl hexyl ketone, vinyl isopropyl ketone, and the like.

Examples of the polyfunctional monomer include diethylene glycol diacrylate, triethylene glycol diacrylate, tetraethylene glycol diacrylate, polyethylene glycol diacrylate, tetramethylolmethane tetramethacrylate, divinylbenzene, divinyl ether, and the like.

Among the above, the polymerizable monomers preferably include styrene or a styrene derivative and an acrylic polymerizable monomer. These polymerizable monomers may be used alone or in combination of two or more.

It is also possible to use a crosslinking agent for the polymerizable monomers. Specifically, compounds having two or more polymerizable double bonds as exemplified below can be used. Carboxylic acid esters having two double bonds such as propylene glycol diacrylate, ethylene glycol diacrylate, 1,6-hexanediol diacrylate, 1,3-butanediol dimethacrylate, and the like, aromatic divinyl compounds such as divinyl benzene, divinyl naphthalene, and the like, divinyl compounds such as divinyl aniline, divinyl ether, divinyl sulfide, divinyl sulfone, and the like; and compounds having three or more vinyl groups. It is preferable to use a carboxylic acid ester from the viewpoint of achieving both low-temperature fixability and high-temperature elasticity. These crosslinking agents may be used alone or in combination of two or more.

The amount of the crosslinking agent added is preferably from 0.01 part by mass to 5.00 parts by mass, and more preferably from 0.10 parts by mass to 3.00 parts by mass with respect to 100 parts by mass of the binder resin or the polymerizable monomers generating the binder resin.

A polymerization initiator may be used in the production of toner particles. A hydrophobic initiator, a water-soluble initiator, and the like can be used as the polymerization initiator. A polymerization initiation with a half-life of 0.5 h to 30 h at the reaction temperature during the polymerization reaction is preferable. Further, it is preferable that the polymerization reaction be carried out with an addition amount of the polymerization initiator of 0.5 parts by mass to 20.0 parts by mass with respect to 100 parts by mass of the polymerizable monomers because usually a polymer having a maximum value of molecular weight of 10,000 to 100,000 is obtained and toner particles having appropriate strength and melting characteristics can be obtained.

Examples of the polymerization initiator include azo-based or diazo-based polymerization initiators such as 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobisisobutyronitrile, and the like; peroxide-based polymerization initiators such as benzoyl peroxide, t-butylperoxy 2-ethylhexanoate, t-butylperoxypivalate, t-butylperoxyisobutyrate, t-butylperoxyneodecanoate, methyl ethyl ketone peroxide, diisopropyl peroxycarbonate, cumene hydroperoxide, 2,4-dichlorobenzoyl peroxide, lauroyl peroxide, and the like. These polymerization initiators may be used alone or in combination of two or more.

In order to control the degree of polymerization of the polymerizable monomer, it is also possible to further add and use known chain transfer agents, polymerization inhibitors, and the like.

Core-Shell Structure

It is preferable that the toner particle have a core and a shell that covers the core, that is, have a core-shell structure. The core preferably includes a styrene-acrylic resin. Further, it is preferable that the shell include the polyester resin of the present disclosure. Where the toner particle has a core-shell structure having a core including a styrene-acrylic resin and a shell covering the core and including the polyester resin of the present disclosure, it is easier to control the orientation state of the structure represented by the formula (A) of the polyester resin near the surface of the toner particle.

When the toner has a toner particle having the core-shell structure, the amount of the polyester resin of the present disclosure is preferably from 1.0 part by mass to 10.0 parts by mass, and more preferably from 5.00 parts by mass to 10.0 parts by mass with respect to 100 parts by mass of the styrene-acrylic resin. Further, in the cross section of the toner observed with a transmission electron microscope, the thickness of the shell is preferably from 100 nm to 200 nm, and more preferably from 100 nm to 150 nm. The thickness of the shell can be controlled by the composition of the monomers constituting the polyester resin and the amount of the polyester resin.

Crystalline Material

The toner particle preferably includes a crystalline material, and when the toner particle has a core-shell structure, the core preferably includes the crystalline material. When the toner has a toner particle having the core-shell structure, the amount of the crystalline material is preferably from 5.00 parts by mass to 50.0 parts by mass, and more preferably from 5.00 parts by mass to 10.0 parts by mass with respect to 100 parts by mass of the styrene-acrylic resin.

The crystalline material is not particularly limited, and a known material having crystallinity can be used. Here, having crystallinity means showing a clear melting point in the measurement using a differential scanning calorimeter (DSC).

From the viewpoint of low-temperature fixability and releasability, it is preferable to use at least one selected from the group consisting of ester waxes, hydrocarbon waxes and crystalline polyester resins as the crystalline material. The ester wax is a wax including a fatty acid ester as a main component.

The preferred ester wax will be described below. The functional number described below indicates the number of ester groups contained in one molecule. For example, behenic behenate is a monofunctional ester wax, and dipentaerythritol hexabehenate is a hexafunctional ester wax.

As the monofunctional ester wax, a condensate of an aliphatic alcohol and an aliphatic carboxylic acid is preferable. In this case, the number of carbon atoms in the aliphatic alcohol is preferably from 6 to 26, and the number of carbon atoms in the aliphatic carboxylic acid is preferably 6 to 26.

Examples of aliphatic alcohols include 1-hexanol, 1-heptanol, 1-octanol, 1-nonanol, 1-decanol, undecyl alcohol, lauryl alcohol, behenyl alcohol, and stearyl alcohol. Examples of the aliphatic carboxylic acid include pentanoic acid, caproic acid, heptanic acid, octanoic acid, nonanoic acid, decanoic acid, behenic acid, and stearic acid.

Examples of bifunctional ester waxes include a combination of a dicarboxylic acid and a monoalcohol, and a combination of a diol and a monocarboxylic acid.

Examples of the dicarboxylic acid include adipic acid, pimelic acid, suberic acid, azelaic acid, sebacic acid, and dodecanedic acid.

Examples of the diol include 1,6-hexanediol, 1,7-heptanediol, 1,8-octanediol, 1,9-nonanediol, 1,10-decanediol, 1,11-undecanediol, and 1,12-dodecanediol.

As the monoalcohol to be condensed with the dicarboxylic acid, an aliphatic alcohol is preferable. Specific examples thereof include tetradecanol, pentadecanol, hexadecanol, heptadecanol, octadecanol, nonadecanol, eikosanol, docosanol, tricosanol, tetracosanol, pentacosanol, hexacosanol, octacosanol, and the like. Among them, docosanol is preferable from the viewpoint of fixability and developability.

As the monocarboxylic acid to be condensed with the diol, an aliphatic carboxylic acid is preferable. Specific examples thereof include lauric acid, myristic acid, palmitic acid, margaric acid, stearic acid, tuberculostearic acid, arachidic acid, behenic acid, lignoceric acid, cerotic acid, and the like. Among them, behenic acid is preferable from the viewpoint of fixability and developability.

Although linear fatty acids and linear alcohols have been exemplified herein, fatty acids having a branched structure and alcohols having a branched structure may be used.

These ester waxes can be used alone or in combination of two or more.

Hereinafter, a crystalline polyester resin as a crystalline material will be described. The crystalline polyester resin is not particularly limited, and known ones can be used, but a saturated polyester is preferable.

Further, the crystalline polyester resin is preferably a condensate of at least one selected from the group consisting of an aliphatic monocarboxylic acid and an aliphatic monoalcohol, and an aliphatic dicarboxylic acid and an aliphatic diol. More preferably, the crystalline polyester resin is a condensate of an aliphatic dicarboxylic acid, an aliphatic diol and an aliphatic monocarboxylic acid. By including at least one selected from the group consisting of an aliphatic monocarboxylic acid and an aliphatic monoalcohol as a constituent component of the crystalline polyester resin, the adjustment of the molecular weight and hydroxyl value of the crystalline polyester resin is facilitated.

Examples of monomers that can be used for the crystalline polyester resin as a crystalline material will be exemplified hereinbelow.

Examples of the aliphatic dicarboxylic acid include oxalic acid, malonic acid, succinic acid, glutaric acid, adipic acid, pimelic acid, suberic acid, azelaic acid, sebacic acid, dodecanedioic acid, hexadecanedicarboxylic acid, octadecanedicarboxylic acid, and the like.

Examples of the aliphatic diol include ethylene glycol, diethylene glycol, triethylene glycol, 1,2-propanediol, 1,3-propanediol, dipropylene glycol, trimethylene glycol, neopentyl glycol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,16-hexadecanediol, 1,18-octadecanediol, and the like.

Examples of the aliphatic monocarboxylic acid include decanoic acid (capric acid), dodecanoic acid (lauric acid), tetradecanoic acid (myristic acid), hexadecanoic acid (palmitic acid), octadecanoic acid (stearic acid), eicosanoic acid (arachidic acid), docosanoic acid (behenic acid), tetracosanoic acid (lignoceric acid), and the like.

Examples of the aliphatic monoalcohol include lauryl alcohol, stearyl alcohol, behenyl alcohol, and the like.

By using such a monocarboxylic acid and a monoalcohol, a crystalline polyester resin having an alkyl group (preferably an alkyl group having from 2 to 24 carbon atoms) at the end can be obtained.

Here, since the monocarboxylic acid has only one carboxylic acid, the structure derived from the monocarboxylic acid is located at the end of the molecular chain of the crystalline polyester resin.

These monomers can be used alone or in combination of two or more.

A method for producing the crystalline polyester resin is not particularly limited, and the usual polyester synthesis method can be used. For example, the crystalline polyester resin can be obtained by subjecting a dicarboxylic acid component and a diol component to an esterification reaction or a transesterification reaction, and then carrying out a polycondensation reaction under reduced pressure or by introducing nitrogen gas according to a conventional method.

The hydrocarbon wax is an aliphatic hydrocarbon wax, for example, low molecular weight polyethylene, low molecular weight polypropylene, microcrystalline wax, Fischer-Tropsch wax, paraffin wax, polyolefin wax, and the like. These hydrocarbon waxes can be used alone or in combination of two or more.

When the core of the toner particle includes a crystalline material, in the cross section of the toner observed with a transmission electron microscope, the average number of domains of the crystalline material is preferably from 8 to 500 (more preferably 250 to 500), the number average diameter of major axes of the domains of the crystalline material is preferably from 50 nm to 300 nm (more preferably 100 nm to 200 nm), and the proportion of the domains present in a region of 25% or less of the distance between a contour and a geometric center of the cross section from the contour of the cross section is preferably from 60% by number to 100% by number (more preferably, 80% by number to 95% by number) with respect to the total number of domains present in the cross section (this proportion will be referred to hereinbelow as "25% ratio").

Controlling the domains of the crystalline material as described above is advantageous from the viewpoint of suppressing the outmigration caused by immobilization of the crystalline material other than at the time of fixing, and also from the viewpoint of uniform toner melting at the time of fixing, and the low-temperature fixability can be further improved.

The average number of domains of the crystalline material and the number average diameter of major axis of the domains of the crystalline material can be controlled by the cooling rate in the cooling step described hereinbelow and the amount of the crystalline material added. Further, the 25% ratio can be controlled by the cooling rate in the cooling step and the amount of the crystalline material added, and also by setting, as appropriate, the difference between the cooling start temperature and the cooling end temperature.

Colorant

The toner particle may include a colorant. As the black colorant, for example, magnetic bodies and carbon black can be used. Furthermore, those colored black using the yellow colorant, magenta colorant and cyan colorant shown hereinbelow can also be used.

Examples of yellow pigments include condensed azo compounds, isoindolinone compounds, anthraquinone compounds, azo metal complexes, methine compounds, and allylamide compounds. Specific examples are presented hereinbelow.

C. I. Pigment Yellow 12, 13, 14, 15, 17, 62, 73, 74, 83, 93, 94, 95, 97, 109, 110, 111, 120, 128, 129, 138, 147, 150, 151, 154, 155, 168, 180, 185, 214.

Examples of magenta pigments include condensation azo compounds, diketopyrrolopyrrole compounds, anthraquinone compounds, quinacridone compounds, basic dye lake compounds, naphthol compounds, benzimidazolone compounds, thioindigo compounds, perylene compounds. Specific examples are presented hereinbelow.

C. I. Pigment Red 2, 3, 5, 6, 7, 23, 48:2, 48:3, 48:4, 57:1, 81:1, 122, 146, 166, 169, 177, 184, 185, 202, 206, 220, 221, 238, 254, 269, C. I. Pigment Violet 19.

Examples of cyan pigments include copper phthalocyanine compounds and derivatives thereof, anthraquinone compounds, basic dye lake compound and the like. Specific examples are presented hereinbelow.

C. I. Pigment Blue 1, 7, 15, 15:1, 15:2, 15:3, 15:4, 60, 62, 66.

These colorants can be used singly or in a mixture, or in the form of a solid solution. Colorants are selected for their hue angle, saturation, brightness, lightfastness, OHP transparency, and dispersibility in the toner. The amount of the colorant is preferably from 1.0 parts by mass to 100.0 parts by mass with respect to 100.0 parts by mass of the binder resin or the polymerizable monomer that produces the binder resin.

The toner can also be a magnetic toner in which magnetic bodies are contained as a colorant in the toner particle. The magnetic body is mainly composed of magnetic iron oxide such as triiron tetraoxide and γ-iron oxide, and may include elements such as phosphorus, cobalt, nickel, copper, magnesium, manganese, aluminum, silicon, and the like. These magnetic bodies preferably have a BET specific surface area of 2 m$^2$/g to 30 m$^2$/g and more preferably 3 m$^2$/g to 28 m$^2$/g as determined by a nitrogen adsorption method. Further, those having a Mohs hardness of 5 to 7 are preferable. The magnetic body shape may be a polyhedron, an octahedron, a hexahedron, a sphere, a needle, or a flake, but a shape with small anisotropy, such as a polyhedron, an octahedron, a hexahedron, and a sphere, is preferred because image density can be increased.

The magnetic bodies preferably have a number average particle diameter of 0.10 μm to 0.40 μm. Generally, the smaller the particle diameter of the magnetic bodies, the higher the tinting strength, but the magnetic bodies tend to aggregate. Therefore, the above range is preferable from the viewpoint of the balance between the tinting strength and the aggregation property.

The number average particle diameter of magnetic bodies can be measured using a transmission electron microscope. Specifically, after the toner particles to be observed are sufficiently dispersed in an epoxy resin, a cured product is obtained by curing in an atmosphere at a temperature of 40° C. for 2 days. The obtained cured product is sliced into a flaky sample with a microtome, and the diameters of 100 magnetic bodies in a visual field are measured in a transmission electron microscope (TEM) micrograph with a magnification of from 10,000 to 40,000. Then, the number average particle diameter is calculated based on the circle-equivalent diameter of the projected area of magnetic bodies. It is also possible to measure the particle diameter with an image analyzer.

The magnetic bodies can be manufactured, for example, by the following method. An aqueous solution including ferrous hydroxide is prepared by adding an alkali such as sodium hydroxide to a ferrous salt aqueous solution in an equivalent or larger amount with respect to the iron component. Air is blown while maintaining the pH of the prepared aqueous solution at pH 7 or higher, and the oxidation reaction of ferrous hydroxide is carried out while heating the aqueous solution to 70° C. or higher to first generate seed crystals that will serve as cores of magnetic iron oxide powder.

Next, an aqueous solution including ferrous sulfate in an amount of about one equivalent based on the amount of alkali added before is added to the slurry-like liquid including the seed crystals. While maintaining the pH of the liquid at 5 to 10, the reaction of ferrous hydroxide is promoted while blowing air, and magnetic iron oxide powder is grown around the seed crystals. At this time, it is possible to control the shape and magnetic characteristics of the magnetic bodies by selecting an arbitrary pH, reaction temperature, and stirring conditions. As the oxidation reaction progresses, the pH of the liquid shifts to the acidic side, but it is preferable that the pH of the liquid be not less than 5. Magnetic bodies can be obtained by using the conventional methods to filter, wash and dry the magnetic bodies thus obtained.

Further, when the toner is produced in an aqueous medium, the surface of the magnetic bodies may be hydrophobized. A method of the hydrophobic treatment is not particularly limited, and either a dry method or a wet method may be used. When the surface is treated by the dry method, the magnetic bodies that have been washed, filtered, and dried can be treated with a coupling agent. When the surface treatment is performed by the wet method, after the oxidation reaction is completed, the dried magnetic bodies are redispersed, or after the oxidation reaction is completed, the iron oxide obtained by washing and filtering is redispersed, without drying, in another aqueous medium, and then the coupling process can be performed.

Examples of the coupling agent that can be used in the surface treatment of the magnetic bodies include a silane coupling agent, a titanium coupling agent, and the like. More preferably used is a silane coupling agent, for example, one represented by a following formula (7).

$$R_m SiY_n \qquad (7)$$

In the formula, R represents an alkoxy group, m is an integer of 1 to 3, Y represents a functional group such as an alkyl group, a vinyl group, an epoxy group, a (meth)acrylic group, and the like, and n is an integer of 1 to 3. However, m+n=4.

A compound in which Y in the formula (7) is an alkyl group can be preferably used. More preferably, Y is an alkyl group having from 3 to 16 carbon atoms, and particularly preferably Y is an alkyl group having from 3 to 10 carbon atoms.

When the above silane coupling agents are used, they can be used alone or in combination of a plurality of types. When a plurality of types is used in combination, the treatment may be performed with each coupling agent individually or with all treatment agents simultaneously.

The total amount of the coupling agent to be used for the treatment is preferably from 0.9 parts by mass to 3.0 parts by mass with respect to 100 parts by mass of the magnetic bodies, and the amount of treatment agent can be adjusted according to the surface area of the magnetic bodies, the reactivity of the coupling agent, and the like.

In addition to the abovementioned materials, known functional resins, charge control agents, conductivity-imparting agents, lubricants, abrasives, and the like may be contained in the toner particle.

Method for Producing Toner

Any known method such as a dry method, an emulsion polymerization method, a dissolution suspension method, or a suspension polymerization method may be used for producing the toner particles. In order to control the presence state of the structure represented by the formula (A) near the surface of the toner particle within the range of the present disclosure, it is preferable that the production method include the following steps.

The step of obtaining resin particles including comprising a polyester resin;
    the dispersion step of obtaining a suspension in which the obtained resin particles are dispersed in an aqueous medium;
    the treatment step of treating the suspension at pH(1) at 95° C. or higher and then treating at pH(2);

the cooling step of cooling the suspension treated in the treatment step at a cooling rate of 50° C./min or more,
wherein
the pH(1) and the pH(2) satisfy following formulas (10) and (11):

$$pH(1)<pH(2) \quad (10)$$

$$6.0 \leq pH(2) \leq 10.5 \quad (11).$$

(Hereinafter, the treatment process that satisfies these requirements will be specifically referred to as the "high-temperature and high-pH treatment step".

It is considered that the high-temperature and high-pH treatment step makes it possible to orient the carboxylic acid at the end of the polyester resin toward the surface side of the toner particle and unevenly distribute the ester bond segments near the surface of the toner particle. Therefore, the orientation state of the structure represented by the formula (A) can be controlled more precisely, and uneven distribution to a depth within 100 nm from the surface of the toner particle is likely to be obtained. In addition, the selectivity of materials such as polyester resin is improved.

By performing the treatment within the above pH range under the condition of 95° C. or higher (more preferably 95° C. to 100° C.), which is higher than usual, the orientation state of the molecules in the polyester resin can be easily changed. By making the pH(2) higher than the pH(1) in the formula (10), it is possible to easily change the orientation state of the polyester resin immobilized in the obtained resin particle.

Specifically, when the pH(2) is set to 6.0 or more in the formula (11), the carboxylic acid at the end of the polyester resin is likely to undergo acid dissociation, so that the carboxylic acid side at the end of the polyester resin is likely to be selectively turned to the surface side of the toner particle, and it becomes easier to control the orientation state more precisely. Further, by setting the pH(2) to 10.5 or less, the generation of bubbles that easily cause the formation of coarse particles can be suppressed, and the generation of fogging due to poor charging caused by the generated coarse particles can be suppressed. The pH(2) is more preferably 7.0 to 9.0. Further, the pH(1) is more preferably 3.0 or more and less than 6.0.

When toner particles are produced in an aqueous medium as in a suspension polymerization method or an emulsion aggregation method, a suspension in which the resin particles are dispersed in the aqueous medium can be obtained. It is preferable to perform the high-temperature and high-pH treatment using the suspension. When toner particles are produced by a dry method such as a pulverization method, it is preferable that the high-temperature and high-pH treatment step be performed after the obtained resin particles are reslurried in an aqueous medium to obtain a suspension. When the high-temperature and high-pH treatment step is not performed, it is preferable to carry out a surface modification step for the resin particles as described hereinbelow.

In the present disclosure, it is preferable to produce toner particles by a suspension polymerization method in which the polymerizable monomer composition is granulated in an aqueous medium and particles of the polymerizable monomer composition are formed.

In the method for producing toner particles by the suspension polymerization method, a granulation step of forming particles of a polymerizable composition including polymerizable monomers and a polyester resin in an aqueous medium, and a polymerization step of obtaining resin particles by polymerizing the polymerizable monomers included in the particles of the polymerizable composition can be used as a step for obtaining resin particles including the polyester resin.

After the polymerization step, it is preferable to perform the high-temperature and high-pH treatment step.

Further, it is preferable that a step of obtaining toner particles having the desired particle diameter through a cooling step of controlling the location and size of the domains of the crystalline material and a holding (annealing) step of controlling the degree of crystallization of the crystalline material be performed after the high-temperature and high-pH treatment.

In controlling the location and size of the domains of the crystalline material, it is preferable that the toner production method include a cooling step of cooling the suspension. It is also preferable to have a holding (annealing) step of controlling the degree of crystallization of the crystalline material. Among these steps, it is more preferable to increase the cooling rate until the suspension that has undergone the high-temperature and high-pH treatment step is cooled to the post-cooling temperature. Specifically, the cooling rate is preferably 50° C./min or more, more preferably from 50° C./min to 350° C./min, and even more preferably from 100° C./min to 300° C./min. Further, it is also preferable that the cooling start temperature in the cooling step be from 70° C. to 100° C.

It is also preferable that the annealing temperature in the annealing step be from 40° C. to 65° C. The holding time of the annealing step is not particularly limited, but may be 1 h to 10 h.

The resin particles obtained as described above can be filtered, washed and dried by a known method to obtain toner particles. The toner particles can be used as a toner as they are, but if necessary, inorganic particles as a flowability improver may be mixed and adhered to the surface of the toner particles to obtain a toner.

Known inorganic particles can be used. Preferred are inorganic particles such as titania particles, silica particles such as wet silica and dry silica, and these silica particles subjected to surface treatment with a silane coupling agent, a titanium coupling agent, silicone oil, or the like. The surface-treated inorganic particles preferably have a degree of hydrophobicity of from 30 to 98 when titrated by the methanol titration test.

Hereinafter, a method for producing toner particles by a pulverization method will be explained in detail by way of an example.

In a raw material mixing step, a polyester resin, and if necessary, a binder resin, a colorant, and other additives are weighed in predetermined amounts, compounded, and mixed as materials constituting the toner particles. Examples of the mixing device include a double-cone mixer, a V-type mixer, a drum-type mixer, a Super mixer, an FM mixer, a Nauta mixer, MechanoHybrid (manufactured by Nippon Coke & Engineering, Ltd.), and the like.

Next, the mixed materials are melt-kneaded to disperse the colorant and the like and obtain a kneaded product. In the melt-kneading step, a batch-type kneader such as a pressure kneader or a Banbury mixer, or a continuous kneader can be used. Single-screw or twin-screw extruders are preferable because of their superiority in continuous production. Examples thereof include a KTK type twin-screw extruder (manufactured by Kobe Steel, Ltd.), a TEM type twin-screw extruder (manufactured by Toshiba Machine Co., Ltd.), a PCM kneader (manufactured by Ikegai Corp.), a twin-screw extruder (manufactured by KCK Engineering Co.), a co-kneader (manufactured by Buss AG), Kneadex (manufactured by Nippon Coke & Engineering Co., Ltd.), and the like. Further, the kneaded product obtained by melt-kneading may be rolled with two rolls or the like and cooled with water or the like in a cooling step.

Then, the cooled product of the kneaded product can be pulverized to a desired particle diameter in the pulverization step. In the pulverization step, after coarse pulverization with a pulverizer such as a crusher, a hammer mill, or a feather mill, fine pulverization is further performed, for example, with Cryptron System (manufactured by Kawasaki Heavy Industries, Ltd.), Super Rotor (manufactured by Nisshin Engineering Co., Ltd.), a turbo mill (manufactured by Freund-Turbo Corporation), or a fine pulverizer based on an air jet method.

After that, if necessary, classification is performed with a classifier or a sieving machine such as Elbow Jet of an inertial classification system (manufactured by Nittetsu Mining Co., Ltd.), Turboplex of a centrifugal force classification system (manufactured by Hosokawa Micron Corporation), a TSP separator (manufactured by Hosokawa Micron Corporation), and Faculty (manufactured by Hosokawa Micron Corporation) to obtain toner particles.

Further, it is preferable that the obtained resin particles be reslurried in an aqueous medium to obtain a suspension, which is then subjected to the high-temperature and high-pH treatment step. When the high-temperature and high-pH treatment step is not performed, it is preferable to perform surface modification, that is, spheroidization treatment, on the obtained resin particles in a surface modification step. As the surface modification step, a hot spheroidizing treatment using hot air is preferably used. For example, Surface Fusing System (manufactured by Nippon Pneumatic Mfg. Co., Ltd.) is an apparatus that can be used for surface modification treatment of resin particles using hot air. In addition, surface modification may be performed by heating resin particles in a surface modification device that uses a high-speed in-air shock method, such as Hybridization System (manufactured by Nara Machinery Co., Ltd.), Kryptron Cosmo Dystem (manufactured by Kawasaki Heavy Industries, Ltd.), Inomizer System (manufactured by Hosokawa Micron Corporation), and the like, or a surface modification device using a dry mechanochemical method, such as Mechanofusion System (manufactured by Hosokawa Micron Corporation), MechanoMill (manufactured by Okada Seiko Co., Ltd.), and the like.

Figure 5:
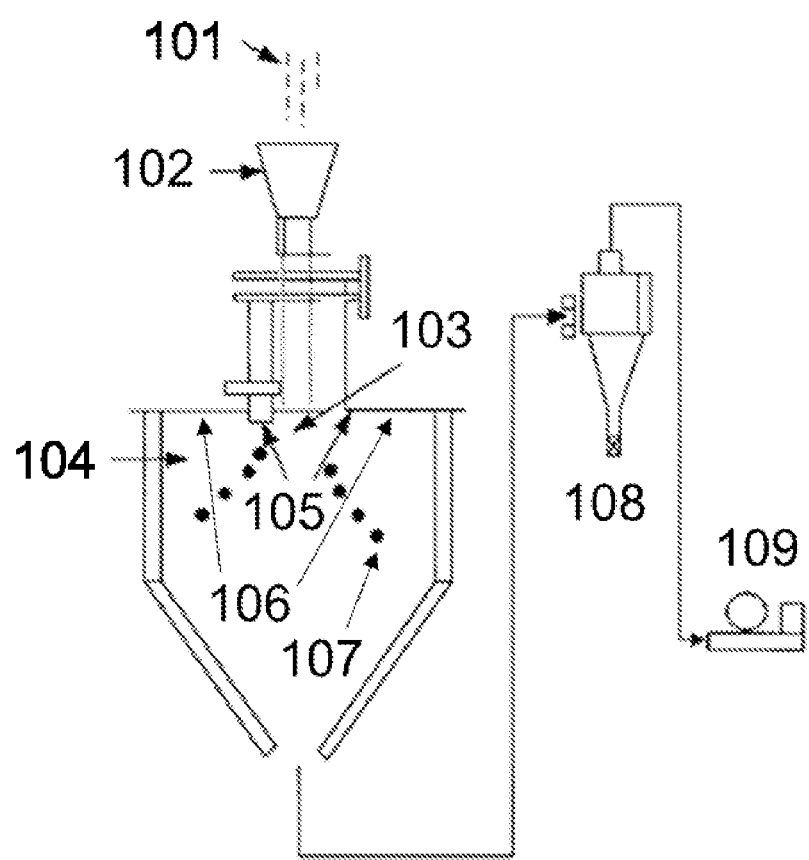
FIG. 5 is a schematic diagram showing an apparatus for modifying the surface of resin particles.

Further, a surface modification device as shown in FIG. 5 can also be used. Using an auto feeder 102, resin particles 101 are supplied to a surface modification device interior 104 through a supply nozzle 103. Since the air in the surface modification device interior 104 is sucked by a blower 109, the resin particles 101 introduced from the supply nozzle 103 are dispersed in the device. To eject minute dust debris that are sucked together when the air is suctioned by blower 109, ejecting mechanism 108 may be equipped with. The resin particles 101 dispersed in the device are surface-modified by instantaneously applying heat with hot air introduced from a hot air introduction port 105. The temperature of the introduced hot air can be adjusted from 100° C. to 450° C., and the setting can be changed at any time according to the toner formulation. From the viewpoint of heat treatment uniformity and productivity, it is preferable that the temperature of the hot air be 100° C. or higher. Further, where the temperature of the hot air is 450° C. or lower, it is possible to suppress the increase in size of the surface modification device itself, and it becomes easy to adjust the heat energy received by the resin particles during the treatment. In addition, the temperature inside the surface modification device can be sufficiently controlled, and the occurrence of the fusion phenomenon can be suppressed.

In the device shown in FIG. 5, hot air is generated by a heater, but the device is not limited to a heater as long as hot air sufficient for surface modification of resin particles can be generated. Surface-modified resin particles 107 may be instantly cooled by the cold air introduced from a cold air introduction port 106. At this time, dehumidified compressed air or $N_2$ gas can be used as the cold air. Further, from the viewpoint of creating an optimum temperature distribution in the device by the interaction with the air flow introduced into the device in addition to the cold air, the temperature of the cold air is preferably from −100° C. to 60° C., and more preferably from −20° C. to 20° C. Where the temperature of the cold air is −100° C. to 60° C., excessive energy is unlikely to be required for the heat treatment, and the treatment itself tends to be uniform.

Further, the resin particles may be spheroidized. For example, after pulverization, the resin particles can be spheroidized using Hybridization System (manufactured by Nara Machinery Co., Ltd.), Mechanofusion System (manufactured by Hosokawa Micron Corporation), Faculty (manufactured by Hosokawa Micron Corporation), Meteo Rainbow MR Type (manufactured by Nippon Pneumatic Mfg. Co., Ltd.), etc.

The obtained resin particles can be used as toner particles as they are, and the toner particles can be used as toner as they are. If necessary, the toner can be obtained by mixing inorganic particles as a flowability improver with the toner particles and adhering the inorganic particles to the surface of the toner particles. However, it is preferable to reslurry the obtained resin particles in an aqueous medium to obtain a suspension and then perform the abovementioned high-temperature and high-pH treatment.

Then, the toner can be obtained by filtering, washing and drying by known methods, and if necessary, mixing and adhering inorganic particles as a flowability improver to the surface. Known inorganic particles can be used. Preferred are inorganic particles such as titania particles, silica particles such as wet silica and dry silica, and these silica particles subjected to surface treatment with a silane coupling agent, a titanium coupling agent, silicone oil, or the like. The surface-treated inorganic particles preferably have a degree of hydrophobicity of from 30 to 98 when titrated by the methanol titration test.

Hereinafter, a method for producing toner particles by the emulsification and aggregation method will be explained in detail by way of an example.

Binder Resin Particle-Dispersed Solution Preparation Process

A binder resin particle-dispersed solution is prepared, for example, in the following manner. When the binder resin is a homopolymer or copolymer (vinyl resin) of a vinyl monomer, the vinyl monomer is subjected to emulsion polymerization, seed polymerization, or the like in an ionic surfactant to prepare a dispersion liquid in which vinyl resin particles are dispersed in the ionic surfactant.

When the binder resin is a resin other than a vinyl resin, such as a polyester resin, the resin is mixed with an aqueous medium in which an ionic surfactant or a polyelectrolyte is dissolved. After that, this solution is heated above the melting point or softening point of the resin to dissolve the resin, and a dispersion liquid in which the binder resin particles are dispersed in an ionic surfactant is prepared using a disperser having a strong shearing force such as a homogenizer.

A means for dispersing is not particularly limited, and examples thereof include devices known as dispersers such as ball mills, sand mills, and dyno mills having a rotary shear homogenizer and media, but a phase inversion emulsification method may be also used as a method for preparing a dispersion liquid. In the phase inversion emulsification method, the binder resin is dissolved in an organic solvent, a neutralizing agent or a dispersion stabilizer is added as necessary, an aqueous solvent is added dropwise under stirring to obtain emulsified particles, and then the organic solvent in the resin-dispersed solution is removed to obtain an emulsion. At this time, the order of adding the neutralizing agent and the dispersion stabilizer may be changed.

In the emulsification and aggregation method, a colorant particle-dispersed solution can be used if necessary. The colorant particle-dispersed solution is formed by dispersing at least the colorant particles in a dispersant. In the emulsification and aggregation method, a wax particle-dispersed solution is used. The wax particle-dispersed solution is formed by dispersing at least a hydrocarbon wax in a dispersant.

Aggregation Step

An aggregation step in which aggregated particles are formed is a step of forming aggregated particles including binder resin particles, hydrocarbon wax particles, and colorant particles added as necessary in an aqueous medium including the binder resin particles, the hydrocarbon wax particles and, if necessary, the colorant particles.

Fusion Step

In a fusion step, the obtained aggregated particles are heated and fused. Before making a transition to the fusion step, a pH adjuster, a polar surfactant, a non-polar surfactant, and the like can be added, as appropriate, in order to prevent fusion between the toner particles.

The heating temperature may be equal to or higher than the glass transition temperature of the resin contained in the aggregated particles (the glass transition temperature of the resin having the highest glass transition temperature when there are two or more types of resin) and lower than the decomposition temperature of the resin. Therefore, the heating temperature varies depending on the type of resin of the binder resin particles and cannot be unconditionally defined, but is generally from the glass transition temperature of the resin contained in the aggregated particles to 140° C. The heating can be performed using a heating device/appliance known as such.

A short fusion time is sufficient if the heating temperature is high, and a long fusion time is required if the heating temperature is low. That is, the fusion time depends on the heating temperature and cannot be unconditionally defined, but is generally from 30 min to 10 h.

Resin particles can be obtained through the abovementioned dispersion liquid preparation step, aggregation step, and fusion step. The obtained resin particles can be directly subjected to the next steps such as filtration, washing, and drying by known methods to obtain toner particles, but it is preferable that the high-temperature and high-pH treatment be performed.

Then, the toner can be obtained by filtering, washing and drying by known methods, and if necessary, mixing and adhering inorganic particles as a flowability improver to the surface. Known inorganic particles can be used. Preferred are inorganic particles such as titania particles, silica particles such as wet silica and dry silica, and these silica particles subjected to surface treatment with a silane coupling agent, a titanium coupling agent, silicone oil, or the like. The surface-treated inorganic particles preferably have a degree of hydrophobicity of from 30 to 98 when titrated by the methanol titration test.

Methods for Measuring Various Physical Properties

Methods for measuring physical properties of the polyester resin, toner particles and toner are described hereinbelow. In the examples described hereinbelow, the physical property values are measured based on these methods.

Method for Measuring Toner Softening Point

The softening point of the toner is measured using a constant-load extrusion type capillary rheometer "Flow Tester CFT-500D" (manufactured by Shimadzu Corporation) according to the manual provided with the device. In this device, while applying a constant-load from the top of the measurement sample with a piston, the temperature of the measurement sample filled in a cylinder is raised, the sample is melted, the melted measurement sample is pushed out from a die at the bottom of the cylinder, and a flow curve showing the relationship between and temperature at this time can be obtained.

In the present disclosure, the softening point is the "melting temperature in the ½ method" described in the manual provided with the "flow characteristic evaluation device Flow Tester CFT-500D". The melting temperature in the ½ method is calculated in the following manner. First, ½ of the difference between the piston descent amount Ymax at the time when the outflow ends and the piston descent amount Ymin at the time when the outflow starts is obtained (this is denoted by X. X=(Ymax−Ymin)/2). The temperature at the flow curve when the piston descent amount in the flow curve is the sum of X and Ymin is the melting temperature in the ½ method.

A columnar measurement sample with a diameter of about 8 mm is prepared by compression molding about 1.6 g of the toner at about 10 MPa for about 60 sec by using a tablet molding compressor (for example, NT-100H, manufactured by NPA System Co., Ltd.) in an environment of 25° C.

The measurement conditions of CFT-500D are as follows.
Test mode: heating method
Starting temperature: 50° C.
Reached temperature: 200° C.
Measurement interval: 1.0° C.
Temperature rise rate: 4.0° C./min
Piston cross-sectional area: 1.000 cm$^2$
Test load (piston load): 10.0 kgf (0.9807 MPa)
Preheating time: 300 sec
Die hole diameter: 1.0 mm
Die length: 1.0 mm Method for Measuring Amount of Ions (Secondary Ion Mass/Secondary Ion Charge Number (m/z)) by Time-of-Flight Secondary Ion Mass Spectrometry (TOF-SIMS)

For the measurement of the amount of ions (peak intensity) using TOF-SIMS, TRIFT-IV manufactured by ULVAC-PHI, Inc. is used.

The analysis conditions are as follows.
Sample preparation: toner is adhered to an indium sheet
Sample pretreatment: none
Primary ion: Au ion
Acceleration voltage: 30 kV
Charge neutralization mode: On
Measurement mode: Positive
Raster: 200 μm
Measurement time: 60 s Normally, TOF-SIMS is a surface analysis method, and the data in the depth direction relate to about 1 nm. Therefore, the intensity inside the toner particles is measured by sputtering the toner particles with argon gas cluster ions and scraping the surface.

The sputtering conditions are as follows.
Acceleration voltage: 10 kV
Current: 3.4 nA
Raster: 600 μm
Irradiation time: 5 s In the depth measurement, a polymethylmethacrylate (PMMA) film is sputtered in advance under the same conditions to confirm the relationship with the irradiation time, and it is confirmed that 100 nm could be removed in an irradiation time of 300 s.

In the present disclosure, the measurement is repeated once for each sputtering under the above conditions, and the intensity at a depth of 100 nm from the surface of the toner particle is taken as the value of the amount of ions measured when sputtering is performed 60 times under the above conditions.

The intensity at the outermost surface of the toner particle is taken as the value of the amount of ions measured without spattering the toner particles after removing the external additives from the toner by the following method to obtain the toner particles.

Calculation/definition of standard values, $A(0)$, $A(100)$, $A(dmax)$: the total count number of 43.5 to 44.5 which is the mass number of the structure represented by the formula (A) is taken as the amount of ions (secondary ion mass/secondary ion charge number (m/z)) of the structure represented by the formula (A), and the value obtained by dividing this value by the total amount of counted ions in the measured toner is taken as the standard value according to the ULVAC-PHI standard software (Win Cadence). The operation for calculating the standard value is performed for all the amounts of ions measured 60 times under the above conditions, the standard value is plotted against the ordinate, and the depth d (nm) from the surface of the toner particle is plotted against the abscissa, thereby obtaining the graph shown in FIG. 1.

As described above, the standard value on the surface of the toner particle (depth 0 nm from the surface of the toner particle) obtained by removing the external additive from the toner is denoted by $A(0)$. Further, the standard value at a depth of 100 nm from the surface of the toner particle is denoted by $A(100)$. Furthermore, when among the standard values measured from the surface of the toner particle to a depth of 100 nm, there are standard values that are 1.05 times or more of the value of $A(0)$ and 1.05 times or more of the value of $A(100)$, these standard values are defined as peaks, and the maximum peak among them is denoted by $A(dmax)$.

Removal of External Additive
(1) The Case of Non-Magnetic Toner

A total of 160 g of sucrose (manufactured by Kishida Chemical Co., Ltd.) is added to 100 mL of ion-exchanged water and dissolved in a water bath to prepare a sucrose concentrate. A total of 31 g of the sucrose concentrate and 6 mL of Contaminone N (10% by mass aqueous solution of a neutral detergent for cleaning precision measuring instruments that is composed of a nonionic surfactant, an anionic surfactant, and an organic builder and has pH 7, manufactured by Wako Pure Chemical Industries, Ltd.) are placed in a centrifuge tube to prepare a dispersion liquid. To this dispersion liquid, 1 g of toner is added, and toner lumps are loosened with a spatula or the like.

The centrifuge tube is set in the abovementioned shaker and shaken for 30 min under the condition of 350 reciprocations per min. After shaking, the solution is transferred to a glass tube (50 mL) for a swing rotor, and centrifugation is performed under the conditions of 58.33 $S^{-1}$ and 30 min with a centrifuge (H-9R; manufactured by Kokusan Co., Ltd.). In the glass tube after centrifugation, toner particles are present in the uppermost layer, and the external additive is present on the aqueous solution side of the lower layer. The toner particles in the upper layer are collected, filtered, and washed with 2 L of running ion-exchanged water warmed to 40° C., and the washed toner particles are taken out.

(2) The Case of Magnetic Toner

A total of 6 mL of Contaminone N (10% by mass aqueous solution of a neutral detergent for cleaning precision measuring instruments that is composed of a nonionic surfactant, an anionic surfactant, and an organic builder and has pH 7, manufactured by Wako Pure Chemical Industries, Ltd.) is added to 100 mL of ion-exchanged water to prepare a dispersion medium. To this dispersion medium, 5 g of toner is added and dispersed with an ultrasonic disperser (AS ONE Corporation, VS-150) for 5 min. After that, the dispersion liquid is set in "KM Shaker" (model: V.SX) manufactured by Iwaki Sangyo Co., Ltd., and the dispersion liquid is shaken for 20 min under the condition of 350 reciprocations per min.

After that, the toner particles are restrained using a neodymium magnet and collected. The toner is washed with 2 L of running ion-exchanged water warmed to 40° C., and the washed toner particles are taken out.

Gradient Polymer Elution Chromatography (GPEC)

A sample to be measured is prepared by adjusting the resin concentration to 0.1% by mass with chloroform and filtering the solution with a 0.45 μm
polytetrafluoroethylene (PTFE) filter. The measurement conditions for gradient polymer elution chromatography (GPEC) are shown hereinbelow.
Device: ULTIMATE 3000 (manufactured by Thermo Fisher Scientific Co., Ltd.)
Mobile phase: A chloroform (HPLC), B acetonitrile (HPLC)
Gradient: 2 min (A/B=0/100)→25 min (A/B=100/0) (The gradient of change in the mobile phase was made linear.)
Flow velocity: 1.0 mL/min
Injection: 0.1% by mass×20 μL
Column: Tosoh TSKgel ODS (4.6 mmφ×150 mm×5 μm)
Column temperature: 40° C.
Detector: Corona charged particle detector (Corona-CAD) (manufactured by Thermo Fisher Scientific Co., Ltd.)

In order to eliminate the influence of the variation in peak intensity due to the difference in detection sensitivity of each peak depending on chemical species, the composition of the mobile phase at the time of elution, etc., and to facilitate comparison between the samples, the data on the ordinate are normalized by the peak top of maximum intensity on each histogram and the adjustment is made to obtain the same display scale.

When the standard value of the peak top of maximum intensity obtained by the measurement is denoted by $S(1)$, the standard value of the peak top of the next highest intensity is denoted by $S(2)$. When the standard value is 0.10 times or more of $S(1)$, which is the standard value of the peak top of maximum intensity, it is regarded as a peak.

Methods for Measuring Molecular Weight of Polyester Resin

The molecular weight of the polyester resin is measured using gel permeation chromatography (GPC), in the manner described below.

First, a sample to be measured is dissolved in tetrahydrofuran (THF) at room temperature. A sample solution is then obtained by filtering the obtained solution using a solvent-resistant membrane filter having a pore diameter of 0.2 μm (a "Mishoridisk" produced by Tosoh Corporation). The sample solution is adjusted so that the concentration of THF-soluble components is 0.8 mass %. Measurements are carried out using this sample solution under the following conditions.

Apparatus: High speed GPC apparatus (HLC-8220GPC produced by Tosoh Corporation)
    Column: Two LF-604 connected in series (produced by Showa Denko Kabushiki Kaisha)
    Eluant: THF
    Flow rate: 0.6 mL/min
    Oven temperature: 40° C.
    Injected amount: 0.020 mL To calculate the molecular weight of the sample, a molecular weight calibration curve is prepared using standard polystyrene resins (product names "TSK Standard Polystyrene F-850, F-450, F-288, F-128, F-80, F-40, F-20, F-10, F-4, F-2, F-1, A-5000, A-2500, A-1000 and A-500", produced by Tosoh Corporation).

Acid Value of Polyester Resin

The acid value is the number of milligrams of potassium hydroxide required to neutralize the acid contained in 1 g of the sample. The acid value in the present disclosure is measured according to JIS K 0070-1992, but specifically, it is measured according to the following procedure.

Titration is performed using a 0.1 mol/L potassium hydroxide ethyl alcohol solution (manufactured by Kishida Chemical Co., Ltd.). The factor of the potassium hydroxide ethyl alcohol solution can be determined by using a potentiometric titration device (potentiometric titration measuring device AT-510 manufactured by Kyoto Electronics Manufacturing Co., Ltd.). A total of 100 mL of 0.100 mol/L hydrochloric acid is taken in a 250 mL tall beaker, titration is performed with the potassium hydroxide ethyl alcohol solution, and the factor is determined from the amount of the potassium hydroxide ethyl alcohol solution required for neutralization. The 0.100 mol/L hydrochloric acid prepared according to JIS K 8001-1998 is used.

The measurement conditions for acid value measurement are shown below.

Titration device: potentiometric titration device AT-510 (manufactured by Kyoto Electronics Manufacturing Co., Ltd.)
    Electrode: composite glass electrode, double junction type (manufactured by Kyoto Electronics Manufacturing Co., Ltd.)
    Control software for titrator: AT-WIN
    Titration analysis software: Tview The titration parameters and control parameters at the time of titration are as follows.

Titration Parameters
    Titration mode: blank titration
    Titration style: total titration
    Maximum titration amount: 20 mL
    Waiting time before titration: 30 sec
    Titration direction: automatic Control Parameters
    End point determination potential: 30 dE
    End point determination potential value: 50 dE/dmL
    End point detection and determination: not set
    Control speed mode: standard
    Gain: 1
    Data collection potential: 4 mV
    Data collection titration amount: 0.1 mL Main test: 0.100 g of the measurement sample is precisely weighed in a 250 mL tall beaker, 150 mL of a mixed solution of toluene/ethanol (3:1) is added, and the dissolution is performed over 1 h. Titration is performed with the potentiometric titrator by using the potassium hydroxide ethyl alcohol solution.

Blank test: titration similar to the above procedure is performed, except that no sample is used (that is, only a mixed solution of toluene/ethanol (3:1) is used). The acid value is calculated by substituting the obtained result into the following formula.

$$A=[(C-B) \times f \times 5.611]/S$$

In the formula, A: acid value (mg KOH/g), B: addition amount of potassium hydroxide ethyl alcohol solution in the blank test (mL), C: addition amount of potassium hydroxide ethyl alcohol solution in the main test (mL), f potassium hydroxide solution factor, S: sample (g).

Method of Identifying and Quantifying Each Unit of Polyester Resin in Toner Particle For the analysis, a pyrolysis gas chromatography mass spectrometer (hereinafter, pyrolysis GC/MS) and NMR are used. In the present disclosure, a component having a molecular weight of 1500 or more is taken as a measurement object. This is because the region with a molecular weight of less than 1500 is considered to be a region in which the proportion of wax is high and the resin component is substantially not contained.

In pyrolysis GC/MS, it is possible to determine all constituent units in the polyester resin and obtain the amount of each unit from the peak area of each unit, but in order to perform quantification, it is necessary to standardize the peak intensity using a sample with a known concentration as a reference. Meanwhile, in NMR, it is possible to determine and quantify all constituent units of the polyester unit without using a sample having a known concentration. Therefore, depending on the situation, the constituent units are identified while comparing the spectra of both NMR and pyrolysis GC/MS.

Specifically, when the amount of the resin component insoluble in deuterated chloroform, which is the extraction solvent at the time of NMR measurement, is less than 5.0% by mass, quantification is performed by NMR measurement.

Meanwhile, when a resin component insoluble in deuterated chloroform, which is an extraction solvent at the time of NMR measurement, is present in an amount of 5.0% by mass or more, both NMR measurement and pyrolysis GC/MS measurement are performed on the deuterated chloroform-soluble component, and pyrolysis GC/MS measurement is performed on the deuterated chloroform-insoluble component. In this case, first, NMR measurement of the deuterated chloroform-soluble component is performed, and the constituent units are determined and quantified (quantification result 1). Next, pyrolysis GC/MS measurement is performed on the deuterated chloroform-soluble component, and the peak area of the peak attributed to each constituent unit is determined. Using the quantitative result 1 obtained by NMR measurement, the relationship between the amount of each constituent unit and the peak area of pyrolysis GC/MS is determined. Next, pyrolysis GC/MS measurement of the deuterated chloroform-insoluble component is performed, and the peak area of the peak attributed to each constituent unit is determined. Based on the relationship between the amount of each constituent unit obtained by measuring the deuterated chloroform-soluble component and the peak area of pyrolysis GC/MS, the constituent units in the deuterated chloroform-insoluble component are quantified (quantification results 2). Then, the quantification result 1 and the quantification result 2 are combined to obtain the final quantification result of each constituent unit.

Specifically, the following operations are performed.

(1) A total of 500 mg of toner is weighed into a 30 mL glass sample bottle, 10 mL of deuterated chloroform is added, the bottle is covered, and dispersion and dissolution are performed with an ultrasonic disperser for 1 h. Then, filtration is performed with a membrane filter having a diameter of 0.4 μm, and the filtrate is collected. At this time, the deuterated chloroform-insoluble component remains on the membrane filter.

(2) Using high-performance liquid chromatography (HPLC), components having a molecular weight of less than 1500 are removed from 3 mL of the filtrate with a fraction collector, and a resin solution from which the components having a molecular weight of less than 1500 have been removed is collected. Chloroform is removed from the collected solution using a rotary evaporator to obtain a resin. The components with a molecular weight less than 1500 are determined by measuring a polystyrene resin having a known molecular weight in advance and obtaining the elution time.

(3) A total of 20 mg of the obtained resin is dissolved in 1 mL of deuterated chloroform, $^1$H-NMR measurement is performed, a spectrum is attributed to each constituent unit used for the polyester resin, and a quantitative value is obtained.

(4) If the deuterated chloroform-insoluble component needs to be analyzed, analysis is performed by pyrolysis GC/MS. If necessary, derivatization treatment such as methylation is performed.

NMR Measurement Conditions
Measuring device: Bruker AVANCE 500, manufactured by Bruker Biospin Co., Ltd.
Measurement nucleus: $^1$H
Measurement frequency: 500.1 MHz
Integration number: 16 times
Measurement temperature: room temperature
Measurement Conditions for Pyrolysis GC/MS
Pyrolysis device: TPS-700, manufactured by Nippon Analytical Industry Co., Ltd.
Pyrolysis temperature: appropriate value 400° C. to 600° C., 590° C. in this case GC/MS device: ISQ, manufactured by Thermo Fisher Scientific Co., Ltd.
Column: "HP5-MS" (Agilent/19091S-433), length 30 m, inner diameter 0.25 mm, membrane thickness 0.25 μm
GC/MS Conditions
Injection Port Conditions:
InletTemp: 250° C.
SplitFlow: 50 mL/min
GC temperature rise condition: 40° C. (5 min)→10° C./min (300° C.)→300° C. (20 min)
Mass range: m/z=10 to 550
Method for Measuring Dielectric Loss Tangent of Polyester Resin The dielectric loss tangent (tan δ=ε''/ε') is calculated from the value of complex permittivity at a frequency of 10,000 Hz measured using a 4284A precision LCR meter (manufactured by Hewlett-Packard Co., Ltd.).

A total of 0.3 g to 0.7 g of polyester resin coarsely pulverized in a mortar is weighed and molded with a load of 350 Kgf/cm$^2$ over 2 min to make a disk-shaped measurement sample with a diameter of 25 mm and a thickness of 1 mm or less. Using ARES (manufactured by Rheometric Scientific F. E.) equipped with a dielectric constant measuring jig (electrode) with a diameter of 25 mm, this measurement sample is measured three times in the frequency range of 1000 Hz to 100,000 Hz at 25° C. under a load of 350 g. Then, the average value of the measured values at 10,000 Hz of each measurement is calculated to obtain the dielectric loss tangent.

When a polyester resin is available alone, the measurement can be performed using the polyester resin. If only the toner is available, the dielectric loss tangent is measured after performing the same operations as in the operations (1) and (2) described in relation to the identification and quantification of each unit of the polyester resin and isolating the polyester resin from the toner.

Method for Calculating Average Number, Number Average Diameter of Major Axes, and Proportion of Domains of Crystalline Material The number average diameter of major axes of the domains of the crystalline material means the number average diameter obtained from the major axes of the domains of the crystalline material based on the toner cross-sectional image observed by a transmission electron microscope (TEM).

The toner cross section observed with a transmission electron microscope (TEM) is prepared as follows.

Observation of the toner particle cross section is performed by ruthenium staining the toner particle cross section. Since the crystalline material is less likely to be stained with ruthenium than the amorphous resin, the contrast becomes clear and the observation is facilitated.

First, the toner is sprayed on cover glass (Matsunami Glass Co., Ltd., angular cover glass, Square No. 1) so as to form a single layer, and an Os film (5 nm) and a naphthalene film (20 nm) are applied as protective films by using an osmium plasma coater (Filgen Co., Ltd., OPC80T). Next, a PTFE tube (Φ1.5 mm×Φ3 mm×3 mm) is filled with a photocurable resin D800 (JEOL Ltd.), and the cover glass is gently placed on the tube with the orientation such that the toner comes into contact with the photocurable resin D800. After curing the resin by light irradiation in this state, the cover glass and the tube are removed to form a cylindrical resin in which toner is embedded in the outermost surface. A layer with a thickness equal to the half of the toner particle diameter (4.0 μm when the weight average particle diameter (D4) is 8.0 μm) is cut from the outermost surface of the cylindrical resin at a cutting speed of 0.6 mm/s by an ultrasonic ultramicrotome (Leica Biosystems Nussloch GmbH, UC7) to expose a cross section of the toner particles. Next, the magnetic toner is cut to a film thickness of 250 nm, and the non-magnetic toner is cut to a film thickness of 70 nm to prepare a flaky sample of toner particle cross section. By cutting by such a method, a cross section of the central portion of the toner particle can be obtained.

The obtained flaky sample is stained for 15 min in a RuO$_4$ gas atmosphere at 500 Pa using a vacuum electron staining device (Filgen, Inc., VSC4R1H), and TEM observation is performed using a TEM (JEOL Ltd., JEM2800).

Images are acquired with a TEM probe size of 1 nm and an image size of 1024×1024 pixel. Further, Contrast of the Detector Control Panel of the bright field image is adjusted to 1425 and Brightness to 3750, Contrast of the Image Control panel is adjusted to 0.0 and Brightness to 0.5, and Gamma is adjusted to 1.00 to acquire an image.

As mentioned above, where a toner is stained with ruthenium, since the crystalline material is difficult to stain, the domains of the crystalline material look black when observed with a TEM. In this way, the domains of the crystalline material are identified. In calculating the number of domains of the crystalline material and the number average diameter of major axes of the domains, cross sections of 100 or more toner particles are observed by the above method. For the observed toner, the number and major axes of domains of all crystalline material are measured, and the average value of the number and the number average diameter of major axes are calculated. The obtained number and number average diameter are defined as the number of domains and the number average diameter of major axes of the crystalline substance.

The proportion of the crystalline domains present in a region of 25% or less of the distance between the contour of a toner cross section and the center of the cross section from the contour (25% ratio) is calculated in the following manner.

The 25% ratio is the proportion (% by number) of the crystalline material in a region within 25% of the distance between the contour of a toner particle cross section to the center of the cross section from the contour.

The method for calculating the 25% ratio is as follows.

In the TEM image, the contour and center of a toner particle cross are obtained by the method described hereinbelow. The cross section of the toner particle to be observed is assumed to exhibit a major axis R (μm) satisfying the relationship of $0.9 \leq R/D4 \leq 1.1$ with respect to the weight average particle diameter (D4) of the toner. The contour of the toner particle cross section is taken along the surface of the toner particle observed in the TEM image. The center point of the toner particle cross section is the center of gravity of the toner particle cross section.

A line is drawn from the obtained center to a point on the contour of the toner particle cross section. On the line, the position of 25% of the distance between the contour and the center of the cross section from the contour is specified.

Figure 4:
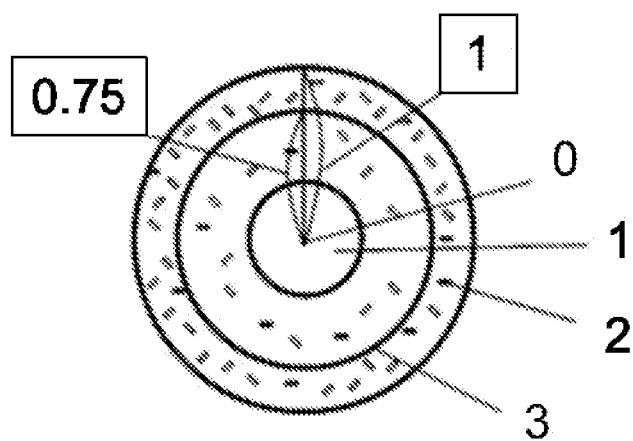
FIG. 4 is a schematic diagram showing the presence state of domains.

Then, this operation is performed for one round of the contour of the toner particle cross section, and the boundary line of 25% of the distance between the contour and the center of the cross section from the contour of the toner particle cross section is clearly indicated (FIG. 4).

The reference numerals in FIG. 4 are as follows. 1: Domain of release agent, 2: Domain of crystalline polyester, 3: Boundary line of 25% of the distance between the contour and the center of the cross section from the contour of the toner particle cross section.

Based on the TEM image in which the 25% boundary line is clearly shown, the number of domains of the crystalline material (hereinafter referred to as A) in the cross section of one toner particle is measured. Further, the number of domains of the crystalline material present in the region of 25% of the distance between the contour and the center of the cross section from the contour of the toner particle cross section in the cross section of one toner particle (hereinafter referred to as B) is measured.

The domains of the crystalline material present on the 25% boundary line is measured as "B".

Next, the 25% ratio in the cross section of one toner particle is calculated by the following formula.

25% ratio in cross section of one toner particle={"B"/"A"}×100(%)

This is done for the cross section of 100 toner particles, and the arithmetic average value is taken as the 25% ratio.

Method for Calculating Shell Thickness of Core-Shell Structure

In the TEM image of the ruthenium-stained toner cross section obtained by the above method, a portion where the domains of the crystalline material are not observed near the toner surface (the portion containing no crystalline material) is considered as a shell. The cross section was observed in 100 or more toner particles, the average value of the distance from the contour to the region containing no crystalline material was calculated, and the value obtained was taken as the thickness of the shell.

Method for Measuring Weight-Average Particle Diameter (D4) and Number-Average Particle Diameter (D1) of Toner The weight-average particle diameter (D4) and the number-average particle diameter (D1) of the toner is calculated in the manner described below. A precision particle size distribution measuring apparatus based on a pore electric resistance method with a 100 μm aperture tube (a Coulter Counter Multisizer 3 (registered trademark) produced by Beckman Coulter, Inc.) and dedicated software for the measurement apparatus (Beckman Coulter Multisizer 3 Version 3.51 produced by Beckman Coulter, Inc.) for setting measurement conditions and analysis of measured data are used for measurement. The measurements are carried out using 25,000 effective measurement channels, and then measurement data is analyzed and calculated. A solution obtained by dissolving special grade sodium chloride in ion exchanged water at a concentration of approximately 1 mass %, such as "ISOTON II" (produced by Beckman Coulter), can be used as an aqueous electrolyte solution used in the measurements.

The dedicated software was set up in the following way before carrying out measurements and analysis. On the "Standard Operating Method (SOM) alteration" screen in the dedicated software, the total count number in control mode is set to 50,000 particles, the number of measurements is set to 1, and the Kd value is set to the value obtained by using "standard particle 10.0 μm" (Beckman Coulter). By pressing the "Threshold value/noise level measurement button", threshold values and noise levels are automatically set. In addition, the current is set to 1600 μA, the gain is set to 2, the electrolyte solution is set to ISOTON II, and the "Flush aperture tube after measurement" option is checked. On the "Conversion settings from pulse to particle diameter" screen in the dedicated software, the bin interval is set to logarithmic particle diameter, the particle diameter bin is set to 256 particle diameter bin, and the particle diameter range is set to from 2 μm to 60 μm.

The specific measurement method is as follows.

1. 200 mL of the aqueous electrolyte solution is placed in a dedicated Multisizer 3 250 mL glass round bottomed beaker, the beaker is set on a sample stand, and a stirring rod is rotated anticlockwise at a rate of 24 rotations/second. By carrying out the "Aperture tube flush" function of the dedicated software, dirt and bubbles in the aperture tube are removed.

2. Approximately 30 mL of the aqueous electrolyte solution is placed in a 100 mL glass flat bottomed beaker. Approximately 0.3 mL of a diluted liquid, which is obtained by diluting "Contaminon N" (a 10 mass % aqueous solution of a neutral detergent for cleaning precision measurement equipment, which has a pH of 7 and comprises a non-ionic surfactant, an anionic surfactant and an organic builder, available from Wako Pure Chemical Industries, Ltd.)

approximately 3-fold in terms of mass with ion exchanged water, is added to the beaker as a dispersant.

3. An ultrasonic wave disperser (Ultrasonic Dispersion System Tetra 150 produced by Nikkaki Bios Co., Ltd.) having an electrical output of 120 W, in which two oscillators having an oscillation frequency of 50 kHz are housed so that their phases are staggered by 1800 is prepared. A predetermined amount of ion exchanged water is placed in a water bath in the ultrasonic dispersion system, and approximately 2 mL of Contaminon N is added to this water bath.

4. The beaker mentioned in step (2) above is placed in a beaker-fixing hole in the ultrasonic wave disperser, and the ultrasonic wave disperser is activated. The height of the beaker is adjusted so that the resonant state of the liquid surface of the aqueous electrolyte solution in the beaker is at a maximum.

5. While the aqueous electrolyte solution in the beaker mentioned in section (4) above is being irradiated with ultrasonic waves, approximately 10 mg of toner is added a little at a time to the aqueous electrolyte solution and dispersed therein. The ultrasonic wave dispersion treatment is continued for a further 60 seconds. When carrying out the ultrasonic wave dispersion, the temperature of the water bath is adjusted as appropriate to a temperature of from 10° C. to 40° C.

6. The aqueous electrolyte solution mentioned in section (5) above, in which the toner is dispersed, is added dropwise by means of a pipette to the round bottomed beaker mentioned in section (1) above, which is disposed on the sample stand, and the measurement concentration is adjusted to approximately 5%. Measurements are carried out until the number of particles measured reaches 50,000.

7. The weight-average particle diameter (D4) and the number-average particle diameter (D1) are calculated by analyzing measurement data using the accompanying dedicated software. The "AVERAGE DIAMETER" on the "ANALYSIS/VOLUME STATISTICAL VALUE (ARITHMETIC MEAN)" screen when the special software is set to graph/volume % is the weight average particle diameter (D4). The "AVERAGE DIAMETER" on the "ANALYSIS/NUMBER STATISTICAL VALUE (ARITHMETIC MEAN)" screen when the special software is set to graph/number % is the number average particle diameter (D1).

EXAMPLES

The present invention is more specifically described herebelow using examples. The present invention is not limited by the examples that follow. The number of parts in the following formulations is on a mass basis in all instances unless specifically indicated otherwise.

Production Example of Polyester Resin 1

A total of 100 parts of a mixture in which raw material monomers other than trimellitic anhydride were mixed in the charging amounts shown in Table 1 and 0.52 parts of tin di(2-ethylhexanoate) as a catalyst were placed in a polymerization tank equipped with a nitrogen introduction line, a dewatering line, and a stirrer. Next, after converting the atmosphere inside the polymerization tank into a nitrogen atmosphere, a polycondensation reaction was carried out over 6 h while heating at 200° C. Further, after raising the temperature to 210° C., trimellitic anhydride was added, the pressure inside the polymerization tank was reduced to 40 kPa, and then a condensation reaction was further carried out. The acid value and weight average molecular weight (Mw) of the obtained polyester resin are as shown in Table 1. Moreover, when GPEC measurement of the obtained polyester resin was performed, S(1) and S(2) were obtained at independent peaks. This resin was designated as polyester resin 1.

Production Examples of Polyester Resins 2 to 12

Polyester resins 2 to 12 were produced by using the raw material monomer charging amount ratios shown in Table 1 and performing the same operations as in the production of the polyester resin 1. At that time, sequential sampling and measurement were performed, and when the desired molecular weight was reached, the polymerization reaction was stopped and the resin was taken out from the polymerization tank. Table 1 shows the physical properties of the obtained resins.

In the polyester resin 9, BPA included a bisphenol A propylene oxide 2 mol adduct and a bisphenol A ethylene oxide 3 mol adduct in a molar ratio of 80.0 to 20.0 (bisphenol A propylene oxide 2 mol adduct. bisphenol A ethylene oxide 3 mol adduct=80.0:20.0). Unless otherwise specified for BPA, the bisphenol A propylene oxide 2 mol adduct was used.

By GPEC measurement, the S(1) and S(2) were obtained from two peaks that are independent of each other for the polyester resins 2, 3, 4, 6 and 8. For polyester resins 5, 7, and 11, the S(1) and S(2) were obtained from two overlapping peaks. As for the polyester resins 9, 10, and 12, since the peak for which S(2) could be defined was not obtained, the portion of S(2)/S(1) is not described.

TABLE 1

| | Acid monomer | | | Alcohol monomer | | Physical properties of resin | | |
| | | | | | | Acid value | | Dielectric loss | |
| Polyester resin | TPA | TMA | BPA | EG | IS | (mgKOH/g) | Mw | tangent | S(2)/S(1) |
|---|---|---|---|---|---|---|---|---|---|
| Polyester resin 1 | 45.0% | 2.0% | 32.0% | 18.0% | 3.0% | 6.0 | 12400 | 0.0110 | 0.57 |
| Polyester resin 2 | 45.0% | 1.5% | 25.0% | 25.0% | 3.5% | 4.5 | 14200 | 0.0140 | 0.76 |
| Polyester resin 3 | 45.0% | 3.5% | 45.0% | 5.0% | 1.5% | 8.2 | 9900 | 0.0078 | 0.40 |
| Polyester resin 4 | 45.0% | 1.0% | 20.0% | 30.0% | 4.0% | 4.0 | 14700 | 0.0145 | 0.81 |
| Polyester resin 5 | 45.0% | 4.0% | 47.0% | 3.0% | 1.0% | 9.1 | 9400 | 0.0075 | 0.33 |
| Polyester resin 6 | 45.0% | 1.0% | 15.0% | 35.0% | 4.0% | 3.5 | 15100 | 0.0150 | 0.88 |
| Polyester resin 7 | 45.0% | 4.5% | 49.0% | 1.0% | 0.5% | 9.8 | 9100 | 0.0072 | 0.28 |
| Polyester resin 8 | 45.0% | 0.5% | 10.0% | 40.0% | 4.5% | 3.3 | 15500 | 0.0153 | 0.90 |
| Polyester resin 9 | 45.0% | 4.0% | 50.5% | 0.5% | 0.0% | 10.3 | 8800 | 0.0067 | — |
| Polyester resin 10 | 49.9% | 0.1% | 50.0% | 0.0% | 0.0% | 9.2 | 11000 | 0.0062 | — |
| Polyester resin 11 | 48.7% | 1.3% | 30.0% | 18.0% | 2.0% | 3.9 | 12000 | 0.0085 | 0.36 |

TABLE 1-continued

| Polyester resin | Acid monomer | | | Alcohol monomer | | Acid value (mgKOH/g) | Physical properties of resin | | |
| --- | --- | --- | --- | --- | --- | --- | --- | --- | --- |
| | TPA | TMA | BPA | EG | IS | | Mw | Dielectric loss tangent | S(2)/S(1) |
| Polyester resin 12 | 50.0% | 0.0% | 50.0% | 0.0% | 0.0% | 2.2 | 9500 | 0.0062 | — |
| Polyester resin 13 | | | | | | Described in the specification | | | |

The notation of the monomer composition indicates the ratio in percent by mass when the mass of the polyester composition is 100.
The abbreviations in the above table are as follows:
TPA: terephthalic acid
TMA: trimellitic anhydride
BPA: bisphenol A
EG: ethylene glycol
IS: isosorbide Production Example of Polyester Resin 13

Bisphenol A propylene oxide 2 mol adduct: 469 parts
Bisphenol A ethylene oxide 2 mol adduct: 137 parts
Terephthalic acid: 152 parts
Fumaric acid: 75 parts
Dodecyl succinic acid: 114 parts The above monomer components were placed in a reaction vessel equipped with a stirrer, a thermometer, a condenser and a nitrogen gas introduction tube, 4 parts of dibutyltin oxide was loaded as a catalyst, and nitrogen gas was introduced into the vessel to maintain an inert atmosphere. After the temperature was raised, the co-condensation reaction was carried out at a temperature from 150° C. to 230° C. for 12 h, and then the pressure was gradually reduced at a temperature from 210° C. to 250° C. to synthesize a polyester resin 13. The weight average molecular weight of the obtained polyester resin 13 was 10,500, the acid value was 12.4 mg KOH/g, and the dielectric loss tangent was 0.0063. Further, the peaks obtained by GPEC measurement were two overlapping peaks, and S(2)/S(1) was 0.27.

Preparation Example of Aqueous Dispersion Liquid 13 of Amorphous Polyester Resin Particles in the Absence of Organic Solvent A total of 200 parts of the polyester resin 13 and 0.2 parts of a 50% by mass aqueous solution of sodium hydroxide were put into the raw material inlet of a twin-screw extruder (TEM-26SS, manufactured by Toshiba Machinery Co., Ltd.), 4.1 parts of a 48.5% by mass aqueous solution of sodium dodecyldiphenyl ether disulfonate (Eleminol MON-7, manufactured by Sanyo Chemical Industries, Ltd.) was added as a surfactant from the fourth barrel of the twin-screw extruder, and kneading was performed at a barrel temperature of 90° C. and a screw rotation speed of 400 rpm to mix the polyester resin, sodium hydroxide, and surfactant.

A total of 150 parts of ion-exchanged water (ion-exchanged water 1) adjusted to 90° C. was added from the fifth barrel of the twin-screw extruder, 150 parts of ion-exchanged water (ion-exchanged water 2) adjusted to 90° C. was added from the seventh barrel, and 150 parts of ion-exchanged water (ion-exchanged water 3) adjusted to 90° C. was added from the ninth barrel, followed by kneading to obtain an aqueous dispersion liquid 13 of amorphous polyester resin particles. The volume average particle diameter D50v of the resin particles was 179 nm. The solid component concentration was adjusted to 25.0% by mass with ion-exchanged water.

Production of WAX1

A total of 100 parts of stearic acid and 10 parts of stearyl alcohol were added to a reaction vessel equipped with a nitrogen introduction tube, a dehydration tube, a stirrer and a thermocouple, and a reaction was carried out at atmospheric pressure for 15 h while distilling off the reaction water at 180° C. under a nitrogen stream. To 100 parts of the crude esterified product obtained by this reaction, 20 parts of toluene and 4 parts of ethanol were added, and the mixture was allowed to stand for 30 min after stirring. Then, the aqueous phase (lower layer) separated from the ester phase was removed to wash the crude esterified product with water. The above washing with water was repeated 4 times until the pH of the aqueous phase reached 7. Then, the solvent was distilled off from the ester phase, which was washed with water, under a reduced pressure condition of 170° C. and 5 kPa to obtain WAX1.

Production of WAX2

WAX2 was obtained by performing the same operations as in the production of WAX1, except that the acid monomer was changed from stearic acid to behenic acid and the alcohol monomer was changed from stearyl alcohol to behenyl alcohol.

Production of Crystalline Polyester Resin 1

A total of 100.0 parts of sebacic acid as an acid monomer 1, 1.6 parts of stearic acid as an acid monomer 2, and 89.3 parts of 1,9-nonanediol as an alcohol monomer were added to a reaction vessel equipped with a nitrogen introduction tube, a dehydration tube, a stirrer, and a thermocouple. The temperature was raised to 140° C. under stirring to heat the components to 140° C. under a nitrogen atmosphere, and a reaction was carried out for 8 h while distilling off water under normal pressure. Then, after adding 0.57 part of tin dioctylate, the reaction was carried out while raising the temperature to 200° C. at 10° C./h. Further, the reaction was carried out for 2 h after the temperature reached 200° C., and then the inside of the reaction vessel was depressurized to 5 kPa or less and the reaction was carried out at 200° C. while observing the molecular weight to obtain a crystalline polyester resin 1. When the obtained crystalline polyester resin 1 was analyzed, the weight average molecular weight was 38,000.

Production of Crystalline Polyester Resin 2

1,10-Decanedicarboxylic acid (dodecanedioic acid): 241 parts
1,9-Nonanediol: 174 parts The above monomer components were placed in a reaction vessel equipped with a stirrer, a thermometer, a condenser and a nitrogen gas introduction tube, and the inside of the reaction vessel was replaced with dry nitrogen gas. Then, 0.25 parts of titanium tetrabutoxide (reagent) was added to 100 parts of the monomer components, followed by stirring and reacting at 170° C. under a nitrogen gas stream for 3 h. Further, the temperature was raised to 210° C., the pressure inside the reaction vessel was reduced to 3 kPa, and stirring and reaction were carried out under reduced pressure for 13 h to obtain a crystalline polyester resin 2. The weight average molecular weight (Mw) of the obtained crystalline polyester resin 2 was 17,200. The acid value of the crystalline polyester resin 2 was 11.4 mg KOH/g. The crystal melting point of the crystalline polyester resin 2 was 75° C.

Preparation of Aqueous Dispersion Liquid 2 of Crystalline Polyester Resin Particles in the Presence of Organic Solvent Crystalline polyester resin 2: 100 parts
Ethyl acetate: 70 parts
Isopropyl alcohol: 15 parts The ethyl acetate and isopropyl alcohol were put into a separable flask, the crystalline polyester resin 2 was gradually put into this mixed medium, and stirring was performed with a three-one motor to perform complete dissolution and obtain an oil phase. A 10% by mass aqueous ammonia solution was gradually added to this oil phase with a dropper so as to make a total of 3 parts, and then 230 parts of ion-exchanged water was gradually added dropwise at a rate of 10 mL/min for phase inversion emulsification. Next, desolvation was carried out with an evaporator while reducing the pressure with an evaporator to obtain an aqueous dispersion 2 of crystalline polyester resin particles.

The volume average particle diameter D50v of the resin particles was 165 nm. The solid component concentration was adjusted to 25.0% by mass with ion-exchanged water.

Preparation of Release Agent-Dispersed Solution

Release agent (manufactured by Nippon Seiro Co., Ltd., product name: FNP0090, melting point 89.7° C.): 270 parts
Anionic surfactant (manufactured by DKS Co., Ltd., Neogen RK, amount of active ingredient: 60% by mass): 13.5 parts (as active ingredient, 3.0% by mass with respect to the release agent)
Ion-exchanged water: 721.6 parts After mixing the above components and dissolving the release agent at an internal liquid temperature of 120° C. with a pressure discharge homogenizer (Gaulin homogenizer, manufactured by Gaulin Co.), dispersion treatment was performed at a dispersion pressure of 5 MPa for 120 min and then at 40 MPa for 360 min, and then cooling was performed to obtain a release agent-dispersed solution. The volume average particle diameter D50v of the particles of this dispersion solution was 230 nm. Ion-exchanged water was then added to adjust the solid component amount to 20.0% by mass and obtain a release agent-dispersed solution.

Preparation of Colorant-Dispersed Solution

Cyan pigment (manufactured by Dainichiseika Color & Chemicals Mfg. Co., Ltd.: ECB301): 200 parts
Anionic surfactant (manufactured by DKS Co., Ltd., Neogen SC): 33 parts (active ingredient 60% by mass; 10% by mass with respect to the cyan pigment)
Ion-exchanged water: 750 parts A total of 280 parts of ion-exchanged water and 33 parts of anionic surfactant were put in a stainless steel container of a size such that when all the above components are added, the liquid level became about ⅓ of the height of the container. After the surfactant was sufficiently dissolved, 200 parts of the cyan pigment was added, stirring was performed with a stirrer until the non-wetted pigment disappeared, and sufficient defoaming was carried out. After defoaming, the remaining ion-exchanged water was added, followed by dispersing at 5,000 rpm for 10 min using a homogenizer (ULTRA-TURRAX T50 manufactured by IKA). Then, defoaming was performed by stirring with a stirrer for 24 h. After defoaming, dispersion was performed again at 6,000 rpm for 10 min using a homogenizer, and then defoaming was performed by stirring with a stirrer for 24 h. Subsequently, the dispersion liquid was dispersed at a pressure of 240 MPa by using a high-pressure impact disperser ULTIMIZER (manufactured by Sugino Machine Ltd., HJP30006). Dispersion equivalent to 10 passes in terms of the total loaded amount and the processing capacity of the apparatus was performed. The obtained dispersion liquid was allowed to stand for 72 h to remove precipitates, and ion-exchanged water was added to adjust the solid component concentration to 15% by mass. The volume average particle diameter D50v of the particles in this colorant-dispersed solution was 115 nm. For the volume average particle diameter D50v, the average value of the three measured values excluding the maximum value and the minimum value among the five measured values obtained with Microtrac was used.

Preparation of Aluminum Sulfate Aqueous Solution

Aluminum sulfate powder (manufactured by Asada Chemical Industry Co., Ltd.: 17% by mass aluminum sulfate): 35 parts
Ion-exchanged water: 1965 parts The aluminum sulfate powder and ion-exchanged water were put into a container and stirred and mixed at 30° C. until precipitates disappeared to prepare an aluminum sulfate aqueous solution as a flocculant.

Magnetic Bodies 1: Production Example of Magnetic Iron Oxide

A total of 55 liters of a 4.0 mol/L sodium hydroxide aqueous solution was mixed and stirred with 50 liters of a ferrous sulfate aqueous solution including $Fe^{2+}$ at 2.0 mol/L to obtain a ferrous salt aqueous solution including a ferrous hydroxide colloid. This aqueous solution was kept at 85° C. and an oxidation reaction was carried out while blowing air at 20 L/min to obtain a slurry including core particles.

After filtering and washing the obtained slurry with a filter press, the core particles were redispersed in water and reslurried. To this reslurried liquid, sodium silicate at 0.20% by mass in terms of silicon per 100 parts of core particles was added, the pH of the slurry liquid was adjusted to 6.0, and stirring was performed to obtain magnetic iron oxide particles having a surface rich in silicon. The obtained slurry was filtered and washed with a filter press, and further reslurried with ion-exchanged water. To this reslurried liquid (solid component 50 g/L), 500 g (10% by mass with respect to the magnetic iron oxide) of ion exchange resin SK110 (manufactured by Mitsubishi Chemical Corporation) was added followed by stirring for 2 h to perform ion exchange. Then, magnetic bodies 1 (magnetic iron oxide) having a number average diameter of 0.23 µm were obtained by filtering off the ion exchange resin with a mesh, filtering and washing with a filter press, drying and pulverizing.

Production Example of Toner 1

Toner particles and toner were produced by the following procedure.

A total of 450 parts of 0.1 mol/L-$Na_3PO_4$ aqueous solution was added to 720 parts of ion-exchanged water, followed by heating to 60° C., and then 67.7 parts of 1.0 mol/L-$CaCl_2$ aqueous solution was added to obtain an aqueous medium including a dispersion stabilizer Preparation of Polymerizable Monomer Composition

| | |
|---|---|
| Styrene | 74.0 parts |
| n-Butyl acrylate | 26.0 parts |
| 1,6-Hexanediol diacrylate | 0.6 parts |
| Magnetic body 1 | 90 parts |
| Polyester resin 1 | 4.0 parts |

The above materials were uniformly dispersed and mixed using an attritor (manufactured by Mitsui Miike Machinery Co., Ltd.). The mixture was then heated to 60° C., and 20.0 parts of WAX 1 as an ester wax and 10.0 parts of paraffin wax (HNP-51 manufactured by Nippon Seiro Co., Ltd.) as a hydrocarbon wax were added, mixed and dissolved to obtain a polymerizable monomer composition.

The monomer composition was put into the aqueous medium and stirred at 60° C. in an $N_2$ atmosphere in an $N_2$ atmosphere for 10 min at 12,000 rpm in T. K. Homomixer (manufactured by Tokushu Kagaku Kogyo Co., Ltd.) to be granulated. Then, while stirring with a paddle stirring blade, 8.0 parts of t-butylperoxypivalate as a polymerization initiator was added, the temperature was raised to 74° C., and the reaction was carried out for 3 h.

After completion of the reaction, the suspension was heated to 100° C. and kept at a pH(1) of 5.0 of the suspension for 2 h as the abovementioned high-temperature and high-pH treatment step. Then, while the suspension was at 100° C., a 0.9 mol/L-$Na_2CO_3$ aqueous solution was added, the pH(2) of the suspension was adjusted to 8.0, and the suspension was kept for 30 min. Then, as a cooling step, water at 7° C. was added to the suspension, the suspension was cooled from 100° C. to 45° C. at a rate of 200° C./min, and then kept at 48° C. for 3 h. Then, the suspension was naturally cooled to 25° C. at room temperature. The cooling rate at that time was 2° C./min. Then, hydrochloric acid was added to the suspension and thorough washing was performed to dissolve the dispersion stabilizer, followed by filtering and drying to obtain toner particles 1 having a weight average particle diameter (D4) of 7.2 μm.

The following materials were mixed with 100 parts of toner particles 1 in a Henschel mixer (FM-10 type manufactured by Mitsui Miike Machinery Co., Ltd.) to obtain toner 1.

Hydrophobic silica particles with a number average particle diameter of 20 nm of primary particles surface-treated with 25% by mass of hexamethyldisilazane: 0.5 parts by mass Hydrophobic silica particles with a number average particle diameter of 40 nm of primary particles surface-treated with 15% by mass of hexamethyldisilazane: 0.5 parts by mass The physical properties of the obtained toner 1 are shown in Tables 4-1 and 4-2.

Production Example of Toner 2

The following materials were put into an attritor (Mitsui Miike Machinery Co., Ltd.) and further dispersed using zirconia particles having a diameter of 1.7 mm at 220 rpm for 5 h to obtain a pigment masterbatch.
Styrene: 60.0 parts
Carbon black (manufactured by Orion Engineered Carbons, product name "Printex 35"): 7 parts
Charge control agent (manufactured by Orient Corporation of America: Bontron E-89): 0.10 parts A total of 450 parts of 0.1 mol/L-$Na_3PO_4$ aqueous solution was added to 720 parts of ion-exchanged water and heated to 60° C., and then 67.7 parts of 1.0 mol/L-$CaCl_2$ aqueous solution was added to obtain an aqueous medium including a dispersion stabilizer.
Preparation of Polymerizable Monomer Composition
Styrene: 14.0 parts
n-Butyl acrylate: 26.0 parts
1,6-Hexanediol diacrylate: 0.6 parts
Pigment masterbatch: 67.1 parts
Polyester resin 1: 4.0 parts In the subsequent steps, the same operations as in the production of toner 1 were performed to obtain toner 2. The physical properties of the obtained toner are shown in Tables 4-1 and 4-2.

Production Examples of Toners 3 and 4

Toners 3 and 4 were obtained by performing the same operations as in the production of toner 1, except that the material composition in the toner 1 was changed as shown in Table 2, and the temperature and pH of the suspension in the high-temperature and high-pH treatment step, the cooling start temperature, cooling rate, and cooling end temperature of the suspension in the cooling step, and the annealing temperature were changed as shown in Table 3. The physical properties of the obtained toner are shown in Tables 4-1 and 4-2.

Production Examples of Toners 5 to 8

Toners 5 to 8 were obtained by performing the same operations as in the production of toner 1, except that the number of parts of the polyester resin 1 in the toner 1 was changed as shown in Table 2. The physical properties of the obtained toner are shown in Tables 4-1 and 4-2.

Production Example of Toner 9

Polyester resin 1: 100.0 parts
Colorant, magnetic bodies 1: 60.0 parts
Crystalline polyester resin 1: 20.0 parts
Release agent, release agent 1 (C105, manufactured by Sasol Ltd., melting point 105° C.): 2.0 parts
Charge control agent T-77 (manufactured by Hodogaya Chemical Co., Ltd.): 2.0 parts The above materials were pre-mixed with an FM mixer (manufactured by Nippon Coke & Engineering Co., Ltd.) and then melt-kneaded with a twin-screw kneading extruder (TEM-26SS, φ26 mm, L/D=48, manufactured by Toshiba Machinery Co., Ltd.).

Then, the kneading feed was set to 20 kg/h and the rotation speed to 200 rpm, and the die temperature and the kneader heater temperature were adjusted so that the temperature of the resin discharged from the die was 150° C.

The obtained kneaded product was cooled, coarsely pulverized with a hammer mill, and then pulverized with a mechanical pulverizer (T-250 manufactured by Turbo Industries, Ltd.), and the obtained finely pulverized powder was classified with a multiple division classifiers using the Coanda effect. Then, surface treatment was performed using a mechanical surface treatment device (Faculty F-400, manufactured by Hosokawa Micron Corporation).

The surface treatment conditions were a dispersion rotation speed of 5500 rpm, a classification rotation speed of 7000 rpm, eight hammers, processing weight of 200 g per batch, and a processing time of 60 sec.

As a result, resin particles 9 having a weight average particle diameter (D4) of 6.8 μm were obtained.

A total of 450 parts of 0.1 mol/L-$Na_3PO_4$ aqueous solution was added to 720 parts of ion-exchanged water and heated to 60° C. in an $N_2$ atmosphere, and then 67.7 parts of 1.0 mol/L-$CaCl_2$ aqueous solution was added to obtain an aqueous medium including a dispersion stabilizer.

Resin particles 9 were added to the aqueous medium and uniformly dispersed and mixed using an attritor (manufactured by Mitsui Miike Machinery Co., Ltd.) to obtain a suspension. While stirring the obtained suspension with a paddle stirring blade, the suspension was heated to 100° C. and kept for 2 h in a state with the pH(1) of the suspension being 5.0 as the high-temperature and high-pH treatment step. Then, while the suspension was kept at 100° C., a 0.9 mol/L-Na$_2$CO$_3$ aqueous solution was added, the pH(2) of the suspension was adjusted to 8.0, and the suspension was kept for 30 min. Then, as a cooling step, water at 7° C. was added to the suspension, the suspension was cooled from 100° C. to 45° C. at a rate of 200° C./min, and then kept at 48° C. for 3 h. Then, the suspension was naturally cooled to 25° C. at room temperature. The cooling rate at that time was 2° C./min.

Then, hydrochloric acid was added to the suspension, and thorough washing was performed to dissolve the dispersion stabilizer, followed by filtering and drying to obtain toner particles 9 having a weight average particle diameter (D4) of 6.9 μm.

The following materials were mixed with 100 parts of the toner particles 9 in a Henschel mixer (FM-10 type manufactured by Mitsui Miike Machinery Co., Ltd.) while maintaining 25° C. and humidifying to 70% RH, to obtain a toner 9.

- Hydrophobic silica particles with a number average particle diameter of 20 nm of primary particles surface-treated with 25% by mass of hexamethyldisilazane: 0.5 parts by mass
- Hydrophobic silica particles with a number average particle diameter of 40 nm of primary particles surface-treated with 15% by mass of hexamethyldisilazane: 0.5 parts by mass The physical properties of the obtained toner 9 are shown in Tables 4-1 and 4-2.

Production Example of Toner 10

Preparation of Polymer-Dispersed Solution
- Toluene: 300.0 parts
- Polyester resin 1: 100.0 parts The above materials were weighed and mixed and dissolved at 90° C.

Separately, 5.0 parts of sodium dodecylbenzene sulfonate and 10.0 parts of sodium laurate were added to 700.0 parts of ion-exchanged water and dissolved by heating at 90° C.

Next, the toluene solution and the aqueous solution were mixed and then stirred using ultrafast stirrer T. K. Robomix 7000 rpm (manufactured by Primix B. V.).

Further, emulsification was carried out at a pressure of 200 MPa using high-pressure impact disperser Nanomizer (manufactured by Yoshida Kikai Kogyo Co., Ltd.). Then, toluene was removed using an evaporator, and the concentration was adjusted with ion-exchanged water to obtain a polymer-dispersed solution having a polymer particle concentration of 20% by mass.

Preparation of Crystalline Material-Dispersed Solution
- Crystalline polyester resin 1: 100.0 parts
- Anionic surfactant Neogen RK (manufactured by DKS Co., Ltd.): 5.0 parts
- Ion-exchanged water: 395.0 parts The above materials were weighed, placed in a mixing container equipped with a stirrer, heated to 90° C., circulated to Clearmix W Motion (manufactured by M-Technique Co., Ltd.), and subjected to dispersion treatment for 60 min. The conditions for the dispersion treatment were as follows.
- Rotor outer diameter: 3 cm
- Clearance: 0.3 mm
- Rotor rotation speed: 19,000 r/min
- Screen rotation speed: 19,000 r/min After the dispersion treatment, a crystalline material-dispersed solution having a concentration of the crystalline material of 20% by mass was obtained by cooling to 40° C. under the cooling treatment conditions of a rotor rotation speed of 1000 r/min, a screen rotation speed of 0 r/min, and a cooling rate of 10° C./min.

Preparation of Magnetic Body-Dispersed Solution
- Magnetic bodies 1: 50.0 parts
- Ion-exchanged water: 450.0 parts The above materials were weighed and mixed, and then dispersed for about 1 h using high-pressure impact disperser Nanomizer (manufactured by Yoshida Kikai Kogyo Co., Ltd.) to obtain a magnetic body-dispersed solution having a concentration of magnetic body particles of 10% by mass.

Production of Toner
- Polymer-dispersed solution: 400.0 parts
- Crystalline material-dispersed solution: 16.0 parts
- Magnetic body-dispersed solution: 480.0 parts
- Ion-exchanged water: 100.0 parts The above materials were put into a round stainless steel flask and mixed.

Subsequently, homogenizer ULTRA-TURRAX T50 (manufactured by IKA) was used for dispersing at 5000 r/min for 10 min. After adjusting the pH to 3.0 by adding a 1.0% nitric acid aqueous solution, heaving was performed to 58° C. while adjusting, as appropriate, the rotation speed so that the mixed solution was stirred with a stirring blade in a water bath for heating.

The volume average particle diameter of the formed aggregated particles was confirmed, as appropriate, using Coulter Multisizer III, and when the aggregated particles having a volume average particle diameter of about 6.0 μm were formed, the stirring was continued for 2 h in a state with a temperature of 58° C. and a pH of 6.0 by using a 5% sodium hydroxide aqueous solution. Then, the temperature of the mixture was raised to 100° C., the stirring was further carried out for 2 h in a state in which the pH(1) at 100° C. was 5.0, and a 5% sodium hydroxide aqueous solution was added to adjust the pH(2) to 8.0, followed by keeping for 30 min.

After that, the crystallization of the polymer was promoted by cooling to 50° C. and keeping for 3 h.

After that, cooling was performed to 25° C., followed by cooling and solid-liquid separation, and then washing with ion-exchanged water was performed.

After the washing was completed, the toner particles 10 having a weight average particle diameter of 6.8 μm were obtained by drying using a vacuum dryer.

The following materials were mixed with 100 parts of the toner particles 10 with a Henschel mixer (FM-10 type manufactured by Mitsui Miike Machinery Co., Ltd.) to obtain the toner 10.

- Hydrophobic silica particles with a number average particle diameter of 20 nm of primary particles surface-treated with 25% by mass of hexamethyldisilazane: 0.5 parts by mass
- Hydrophobic silica particles with a number average particle diameter of 40 nm of primary particles surface-treated with 15% by mass of hexamethyldisilazane: 0.5 parts by mass The physical properties of the obtained toner 10 are shown in Tables 4-1 and 4-2.

Production Example of Toners 11 to 15

Toners 11 to 15 were obtained by performing the same operations as in the production of toner 1, except that the material composition in the toner 1 was changed as shown in Table 2, and the temperature and pH of the suspension in the high-temperature and high-pH treatment step, the cooling start temperature, cooling rate, and cooling end temperature of the suspension in the cooling step, and the annealing temperature were changed as shown in Table 3. The physical properties of the obtained toner are shown in Tables 4-1 and 4-2.

Production Example of Toner 16

Toner 16 was obtained by performing the same operations as in the production of toner 1, except that in the production example of toner 1, the 0.9 mol/L-Na$_2$CO$_3$ aqueous solution was not added to the suspension, the material composition was changed as shown in Table 2, and the pH of the suspension at the time the temperature was raised to 100° C. was changed as shown in Table 3. The physical properties of the obtained toner are shown in Tables 4-1 and 4-2.

Production Example of Toner 17

Toner 17 was obtained by performing the same operations as in the production of toner 9, except that in the production example of toner 9, the material composition was changed as shown in Table 2, the obtained finely pulverized powder was classified using a multi-division classifier utilizing the Coanda effect, and then the surface thereof was modified with the surface modification device shown in FIG. 5 to obtain resin particles, and the obtained resin particles were used as they were as toner particles without any operation in an aqueous medium. The physical properties of the obtained toner are shown in Tables 4-1 and 4-2. The conditions for surface modification with the surface modification device shown in FIG. 5 are as shown below.
Conditions for Surface Modification
Raw material supply speed: 2.0 kg/h
Hot air flow rate: 4.5 m$^3$/min
Hot air discharge temperature: 220° C.
Cold air temperature: 3° C.
Cold air flow rate 3.0 m$^3$/min Production Example of Toner 18

Toner 18 was obtained by performing the same operations as in the production of toner 9, except that in the production example of toner 9, the material composition was changed as shown in Table 2, and the obtained resin particles were used as they were as toner particles without any operation in an aqueous medium. The physical properties of the obtained toner are shown in Tables 4-1 and 4-2.

Production Example of Toners 19 to 21

Toners 19 to 21 were obtained by performing the same operations as in the production of toner 1, except that the material composition in the toner 1 was changed as shown in Table 2, and the temperature and pH of the suspension in the high-temperature and high-pH treatment step, the cooling start temperature, cooling rate, and cooling end temperature of the suspension in the cooling step, and the annealing temperature were changed as shown in Table 3. The physical properties of the obtained toner are shown in Tables 4-1 and 4-2.

Production Examples of Toners 22 and 23

Toners 22 and 23 were obtained by performing the same operations as in the production of toner 2, except that the material composition in the toner 2 was changed as shown in Table 2, and the temperature and pH of the suspension in the high-temperature and high-pH treatment step, the cooling start temperature, cooling rate, and cooling end temperature of the suspension in the cooling step, and the annealing temperature were changed as shown in Table 3. The physical properties of the obtained toner are shown in Tables 4-1 and 4-2.

Production Example of Toner 24

Toner 24 was obtained by performing the same operations as in the production of toner 1, except that the material composition in the toner 1 was changed as shown in Table 2, and the temperature and pH of the suspension in the high-temperature and high-pH treatment step, the cooling start temperature, cooling rate, and cooling end temperature of the suspension in the cooling step, and the annealing temperature were changed as shown in Table 3. The physical properties of the obtained toner are shown in Tables 4-1 and 4-2.

Production Example of Toner 25

Toner 25 was obtained by performing the same operations as in the production of toner 9, except that in the production example of toner 9, the polyester resin 1 was replaced with the polyester resin 9, and the obtained resin particles were used as they were as toner particles without any operation in an aqueous medium. The physical properties of the obtained toner are shown in Tables 4-1 and 4-2.

Production Example of Toner 26

Addition of Ammonium Compound
As the ammonium compound, a 10% by mass aqueous ammonia solution was used. After the production of the aqueous dispersion liquid 2 of crystalline polyester resin particles, the 10% by mass aqueous ammonia solution was added to the aqueous dispersion liquid 2 of crystalline polyester resin so that the amount of the ammonium compound became 2.5 parts with respect to 1000 parts of the crystalline polyester resin 2, followed by stirring for 3 min.
Further, after the preparation of the aqueous dispersion liquid 13 of amorphous polyester resin particles, the 10% by mass aqueous ammonia solution was added to the aqueous dispersion liquid 13 of amorphous polyester resin particles so that the amount of the ammonium compound became 2.5 parts with respect to 1000 parts of the polyester resin 13, followed by stirring for 3 min.
Preparation of Toner Component Dispersion Liquid
After adding the ammonium compound, the following components were placed in a stirring tank equipped with a thermometer, a pH meter, a stirrer, and a jacket, followed by stirring for 10 min.
  Aqueous dispersion liquid 2 of crystalline polyester resin particles to which the ammonium compound was added: 57 parts
  Aqueous dispersion liquid 13 of amorphous polyester resin particles to which the ammonium compound was added: 635 parts
  Colorant particle-dispersed solution: 100 parts
  Release agent particle-dispersed solution: 115 parts
  Ion-exchanged water: 200 parts
  Anionic surfactant (Neogen RK, manufactured by DSK Co., Ltd.): 7.0 parts While gradually adding 125 parts of an aqueous aluminum sulfate solution to the above dispersion liquid mixture placed in the stirring tank, the mixture was introduced into Cavitron CD1010 (manufactured by Eurotech Co., Ltd.) from the bottom valve of the stirring tank and dispersed for 10 min. After the addition was completed, the temperature of the jacket was started to be raised at 50° C., and after 120 min, the particle diameter was measured with Multisizer II (aperture diameter: 50 μm, manufactured by Beckman-Coulter Inc.). The volume average particle diameter was 5.0 μm.

Then, 312 parts of the additional aqueous dispersion liquid 13 of the amorphous polyester resin particles was added, followed by keeping for 30 min. After that, a 4% by mass sodium hydroxide aqueous solution was added to the stirring tank to adjust the pH to 9.0, and then the temperature of the jacket was raised to 90° C. and maintained. When the shape and surface properties of the aggregated particles were observed with an optical microscope and a scanning electron microscope (FE SEM) every 30 min, coalescence of the particles was confirmed at 4 h, so the obtained slurry was cooled to 40° C.

The cooled slurry was sieved with a vibrating sieve (KGC800: manufactured by Kowa Kogyosho Co., Ltd.) having an opening of 15 μm, and then filtered with a filter press (manufactured by Tokyo Engineering Co., Ltd.). Then, ion-exchanged water in an amount 10 times the mass of the toner was passed through the toner in the filter press device to wash the toner. The washed toner was dried by cyclone collection using a loop type air flow dryer (Flash Jet Dryer FJD-2 manufactured by Seishin Enterprise Co., Ltd.) to obtain toner particles.

To 100 parts of the obtained toner particles, 1.0 part of hydrophobic silica (manufactured by Nippon Aerosil Co., Ltd., RY50) and 0.8 part of hydrophobic titanium oxide (manufactured by Nippon Aerosil Co., Ltd., T805) were added followed by mixing at 13,000 rpm for 30 sec using a sample mill. Then, sieving with a vibrating sieve having an opening of 45 μm was performed to obtain a toner.

Preparation of Carrier

Mn—Mg—Sr-based ferrite particles (average particle diameter 40 μm): 100 parts
Toluene: 14 parts
Cyclohexyl methacrylate/dimethylaminoethyl methacrylate copolymer (copolymerization mass ratio 99:1, weight average molecular weight Mw 80,000): 2.0 parts
Carbon black (VXC72: manufactured by Cabot Corporation): 0.12 parts The above components excluding ferrite particles and glass beads (φ1 mm, the same amount as toluene) were stirred at 1200 ppm for 30 min using a sand mill manufactured by Kansai Paint Co., Ltd. to prepare a solution for forming a resin coating layer. Further, the solution for forming a resin coating layer and the ferrite particles were placed in a vacuum degassing type kneader, the pressure was reduced, and toluene was distilled off/dried to form a resin-coated carrier.

Preparation of Toner 26

A total of 40 parts of the toner was added to 500 parts of the resin-coated carrier, the components were blended with a V-type blender for 20 min, and then aggregates were removed with a vibrating sieve having an opening of 212 μm to obtain a toner 26.

TABLE 2

| Toner No. | Polyester resin No. | Polyester resin amount (parts) | Ester-based crystalline resin type | Crystalline material amount (parts) | St/BA |
|---|---|---|---|---|---|
| Toner 1 | Polyester resin 1 | 4.0 | WAX1 | 20.0 | 74/26 |
| Toner 2 | Polyester resin 1 | 4.0 | WAX1 | 20.0 | 74/26 |
| Toner 3 | Polyester resin 2 | 2.0 | WAX1 | 50.0 | 73/27 |
|  | Polyester resin 3 | 8.0 |  |  |  |
| Toner 4 | Polyester resin 4 | 16.0 | WAX1 | 55.0 | 72/28 |
|  | Polyester resin 5 | 1.0 |  |  |  |
| Toner 5 | Polyester resin 1 | 10.0 | WAX1 | 20.0 | 74/26 |
| Toner 6 | Polyester resin 1 | 15.0 | WAX1 | 20.0 | 74/26 |
| Toner 7 | Polyester resin 1 | 1.0 | WAX1 | 20.0 | 74/26 |
| Toner 8 | Polyester resin 1 | 0.8 | WAX1 | 20.0 | 74/26 |
| Toner 9 | Polyester resin 1 | Described in the specification |  |  |  |
| Toner 10 | Polyester resin 1 | Described in the specification |  |  |  |
| Toner 11 | Polyester resin 1 | 4.0 | WAX1 | 20.0 | 74/26 |
| Toner 12 | Polyester resin 1 | 4.0 | WAX1 | 20.0 | 74/26 |
| Toner 13 | Polyester resin 1 | 4.0 | WAX1 | 5.0 | 74/26 |
| Toner 14 | Polyester resin 1 | 4.0 | WAX1 | 4.0 | 74/26 |
| Toner 15 | Polyester resin 5 | 4.0 | WAX1 | 4.0 | 74/26 |
| Toner 16 | Polyester resin 6 | 2.0 | WAX1 | 20.0 | 74/26 |
|  | Polyester resin 7 | 2.0 |  |  |  |
| Toner 17 | Polyester resin 2 | 75.0 | Described in the specification |  |  |
|  | Polyester resin 3 | 25.0 |  |  |  |
| Toner 18 | Polyester resin 2 | 90.0 | Described in the specification |  |  |
|  | Polyester resin 3 | 10.0 |  |  |  |
| Toner 19 | Polyester resin 1 | 4.0 | WAX1 | 20.0 | 74/26 |
| Toner 20 | Polyester resin 8 | 16.0 | WAX1 | 20.0 | 74/26 |
|  | Polyester resin 9 | 1.0 |  |  |  |
| Toner 21 | Polyester resin 9 | 4.0 | WAX1 | 20.0 | 74/26 |
| Toner 22 | Polyester resin 10 | 4.0 | WAX1 | 20.0 | 77/23 |
| Toner 23 | Polyester resin 11 | 4.0 | WAX2 | 20.0 | 76/24 |
| Toner 24 | Polyester resin 12 | 4.0 | WAX2 | 20.0 | 75/25 |
| Toner 25 | Polyester resin 9 | Described in the specification |  |  |  |
| Toner 26 | Polyester resin 13 | Described in the specification |  |  |  |

St represents styrene, BA represents n-butyl acrylate, and St/BA represents the mass ratio of styrene and n-butyl acrylate in the core.

TABLE 3

| | Conditions of high-temperature and high-pH treatment step | | | Start temperature of cooling step | End temperature of cooling step | Cooling rate | Annealing temperature |
|---|---|---|---|---|---|---|---|
| Toner No. | Temperature | pH(1) | pH(2) | (° C.) | (° C.) | (° C./min) | (° C.) |
| Toner 1 | 100° C. | 5.0 | 8.0 | 100 | 45 | 200 | 48 |
| Toner 2 | 100° C. | 5.0 | 8.0 | 100 | 45 | 200 | 48 |
| Toner 3 | 100° C. | 5.0 | 8.0 | 100 | 25 | 350 | 48 |
| Toner 4 | 100° C. | 5.0 | 8.0 | 100 | 25 | 400 | 48 |
| Toner 5 | 100° C. | 5.0 | 8.0 | 100 | 45 | 200 | 48 |
| Toner 6 | 100° C. | 5.0 | 8.0 | 100 | 45 | 200 | 48 |
| Toner 7 | 100° C. | 5.0 | 8.0 | 100 | 45 | 200 | 48 |
| Toner 8 | 100° C. | 5.0 | 8.0 | 100 | 45 | 200 | 48 |
| Toner 9 | 100° C. | 5.0 | 8.0 | 100 | 45 | 200 | 48 |
| Toner 10 | 100° C. | 5.0 | 8.0 | Described in the specification | | | |

TABLE 3-continued

| Toner No. | Conditions of high-temperature and high-pH treatment step Temperature | pH(1) | pH(2) | Start temperature of cooling step (° C.) | End temperature of cooling step (° C.) | Cooling rate (° C./min) | Annealing temperature (° C.) |
|---|---|---|---|---|---|---|---|
| Toner 11 | 100° C. | 5.0 | 10.5 | 100 | 45 | 200 | 48 |
| Toner 12 | 100° C. | 5.0 | 11.0 | 100 | 45 | 200 | 48 |
| Toner 13 | 95° C. | 5.0 | 6.0 | 95 | 45 | 100 | 48 |
| Toner 14 | 90° C. | 5.0 | 5.5 | 90 | 45 | 50 | 48 |
| Toner 15 | 90° C. | 5.0 | 8.0 | 90 | 45 | 200 | 48 |
| Toner 16 | 100° C. | 5.0 | 4.8 | 100 | 45 | 200 | 48 |
| Toner 17 | | | | Described in the specification | | | |
| Toner 18 | | | | | | | |
| Toner 19 | 100° C. | 5.0 | 6.0 | 100 | 45 | 30 | 48 |
| Toner 20 | 100° C. | 5.0 | 11.0 | 100 | 45 | 200 | 48 |
| Toner 21 | 100° C. | 5.0 | 5.5 | 100 | 45 | 50 | 48 |
| Toner 22 | 80° C. | 5.0 | 8.0 | 80 | 45 | 5 | 55 |
| Toner 23 | 100° C. | 5.0 | 4.8 | 100 | 55 | 5 | 55 |
| Toner 24 | 100° C. | 5.0 | 4.8 | 100 | 55 | 200 | 48 |
| Toner 25 | | | | Described in the specification | | | |
| Toner 26 | | | | | | | |

TABLE 4-1

| Toner No. | D4 (μm) | Particle size distribution (D4/D1) | Softening point (° C.) | A(dmax)/A(0) ※1 | A(0) | A(dmax)/A(100) ※2 | A(100) |
|---|---|---|---|---|---|---|---|
| Toner 1 | 7.2 | 1.12 | 120 | 1.35 | 0.065 | 1.51 | 0.058 |
| Toner 2 | 7.1 | 1.12 | 120 | 1.34 | 0.065 | 1.50 | 0.058 |
| Toner 3 | 7.0 | 1.16 | 107 | 1.98 | 0.058 | 1.15 | 0.100 |
| Toner 4 | 6.9 | 1.17 | 102 | 5.00 | 0.055 | 1.02 | 0.270 |
| Toner 5 | 7.4 | 1.13 | 122 | 1.33 | 0.100 | 1.37 | 0.103 |
| Toner 6 | 7.3 | 1.12 | 124 | 1.31 | 0.120 | 1.35 | 0.124 |
| Toner 7 | 7.1 | 1.13 | 119 | 1.33 | 0.014 | 1.86 | 0.010 |
| Toner 8 | 7.2 | 1.14 | 119 | 1.36 | 0.010 | 1.94 | 0.007 |
| Toner 9 | 6.9 | 1.14 | 117 | 1.19 | 0.067 | 1.18 | 0.062 |
| Toner 10 | 6.8 | 1.12 | 114 | 1.18 | 0.066 | 1.17 | 0.063 |
| Toner 11 | 7.3 | 1.13 | 118 | 1.45 | 0.061 | 1.60 | 0.058 |
| Toner 12 | 7.2 | 1.12 | 119 | 1.60 | 0.057 | 1.75 | 0.058 |
| Toner 13 | 7.1 | 1.13 | 135 | 1.22 | 0.069 | 1.30 | 0.063 |
| Toner 14 | 7.4 | 1.14 | 150 | 1.17 | 0.072 | 1.22 | 0.069 |
| Toner 15 | 7.3 | 1.14 | 123 | 1.15 | 0.071 | 1.21 | 0.067 |
| Toner 16 | 7.6 | 1.20 | 122 | 1.33 | 0.066 | 1.48 | 0.071 |
| Toner 17 | 7.0 | 1.14 | 123 | 1.20 | 0.073 | 1.21 | 0.071 |
| Toner 18 | 7.1 | 1.14 | 122 | 1.15 | 0.075 | 1.15 | 0.075 |
| Toner 19 | 7.1 | 1.14 | 160 | 1.15 | 0.072 | 1.22 | 0.064 |
| Toner 20 | 7.2 | 1.13 | 121 | 5.50 | 0.053 | 1.04 | 0.290 |
| Toner 21 | 7.2 | 1.13 | 150 | 1.08 | 0.078 | 1.13 | 0.075 |
| Toner 22 | 7.7 | 1.14 | 134 | — | 0.081 | — | 0.080 |
| Toner 23 | 6.9 | 1.14 | 130 | — | 0.077 | — | 0.074 |
| Toner 24 | 6.7 | 1.13 | 125 | — | 0.031 | — | 0.030 |
| Toner 25 | 6.8 | 1.14 | 125 | — | 0.076 | — | 0.076 |
| Toner 26 | 6.3 | 1.14 | 127 | 1.05 | 0.120 | 1.06 | 0.119 |

TABLE 4-2

| Toner No. | Shell thickness (nm) ※3 | Average number of crystalline material domains (number) | Major axis diameter of crystalline material domain (nm) | 25% ratio (% by number) |
|---|---|---|---|---|
| Toner 1 | 115 | 300 | 120 | 85 |
| Toner 2 | 118 | 290 | 122 | 83 |
| Toner 3 | 200 | 500 | 50 | 95 |
| Toner 4 | 320 | 520 | 45 | 100 |
| Toner 5 | 200 | 300 | 120 | 85 |
| Toner 6 | 290 | 300 | 120 | 85 |
| Toner 7 | 106 | 280 | 122 | 78 |
| Toner 8 | 100 | 285 | 125 | 82 |
| Toner 9 | — | 285 | 125 | 82 |
| Toner 10 | — | 285 | 125 | 84 |
| Toner 11 | 153 | 310 | 110 | 87 |
| Toner 12 | 151 | 305 | 115 | 80 |
| Toner 13 | 118 | 10 | 300 | 60 |
| Toner 14 | 117 | 5 | 330 | 50 |
| Toner 15 | 116 | 295 | 125 | 75 |
| Toner 16 | 153 | 290 | 130 | 77 |
| Toner 17 | — | 280 | 130 | 81 |
| Toner 18 | — | 285 | 135 | 83 |
| Toner 19 | 117 | 3 | 350 | 40 |
| Toner 20 | 153 | 290 | 135 | 77 |

TABLE 4-2-continued

| Toner No. | Shell thickness (nm) ☒3 | Average number of crystalline material domains (number) | Major axis diameter of crystalline material domain (nm) | 25% ratio (% by number) |
|---|---|---|---|---|
| Toner 21 | 113 | 5 | 330 | 50 |
| Toner 22 | 118 | 285 | 125 | 72 |
| Toner 23 | 118 | 1 | 700 | 50 |
| Toner 24 | 120 | 1 | 800 | 50 |
| Toner 25 | — | 250 | 130 | 75 |
| Toner 26 | — | 285 | 125 | 80 |

Absence of data in *1 and *2 indicates that a clear peak value could not be detected.
Absence of data in *3 indicates that a clear shell is not present.

Next, examples and comparative examples will be described in detail.

Example 1

The following evaluations were performed using toner 1.
Evaluation 1 Fixing Performance Evaluation 1 (Low-Temperature Fixability)

The evaluation was carried out in an environment of 23° C. and 50% RH. FOX RIVER BOND paper (110 g/m$^2$) was used as a fixing medium. Where a medium that is thick paper having a relatively large surface unevenness is used, the below-described blank dots are likely to occur, and stringent evaluation of low-temperature fixability can be performed. As an image forming apparatus, a commercially available LBP-3100 (manufactured by Canon Inc.) was modified by changing the printing speed from 16 sheets/min to 40 sheets/min and removing a fixing device.

After adjusting the toner laid-on level on the paper to 9 g/m$^2$ at room temperature (25° C.), 100 solid black images were printed continuously in an unfixed state. Then, the 95th to 100th unfixed solid black images were fixed using a modified fixing device in which a fixing unit was modified so that the fixing temperature could be adjusted, and the average value of the number of blank dots was measured. By continuously printing solid black images, a state is assumed in which the heat of the fixing device is taken away by the media and the heat is not sufficiently retained, so that stringent evaluation of low-temperature fixability of the toner can be performed. Where the low-temperature fixability of the toner is insufficient, a so-called blank-dot image is output in which the unfixed toner forms blank dots. Using a microscope or the like capable of magnifying 10 times or more, a total of 6 solid black images of the 95th fixed image to the 100th fixed image were visually observed, and the average value of the number of generated blank dots was measured. In this evaluation, the fixing performance was evaluated by the temperature of the fixing device at which the average value of the number of blank dots was less than 10. The lower the temperature, the better the low-temperature fixability of the toner. The evaluation results are shown in Table 5. Where the temperature was 205° C. or lower, it was determined that the effect of the present disclosure was obtained.

Evaluation 2 Fixing Performance Evaluation 2 (Adhesion to Paper)

FOX RIVER BOND paper (110 g/m$^2$) was used as the fixing medium, the commercially available LBP-3100 (manufactured by Canon Inc.) was modified to change the printing speed from 16 sheets/min to 40 sheets/min, remove the fixing device, and enable the adjustment of development bias. The evaluation image was a line image.

By varying the development bias and setting a high reflection density of an image part, the amount of toner on the image was increased. In addition, since thick paper with relatively large surface irregularities is used, the toner in the recesses of the paper and the lower layer portion of the toner layer is unlikely to melt in the fixing step. Therefore, stringent evaluation can be performed with respect to peeling. As for the evaluation environment, where the temperature is low, the fixing device does not easily warm up, which results in stringent evaluation. The evaluation procedure is described hereinbelow.

First, the image forming apparatus and the modified fixing device in which the fixing unit was modified so that the fixing temperature could be adjusted were allowed to stand overnight in a low-temperature and low-humidity environment (temperature 15° C., humidity 10%). Then, using the image forming apparatus, an unfixed image of a horizontal line adjusted for development bias was printed using FOX RIVER BOND paper so that the toner laid-on level on the paper was 9 g/m$^2$ and the line width was 180 μm. Next, the fixing temperature control of the modified fixing device was set to 205° C., and the unfixed image of the horizontal line was fixed. After the fixed line image was allowed to stand in a low-temperature and low-humidity environment for 1 h, a polypropylene tape (Klebeband 19 mm×10 mm, manufactured by tesa SE) was attached to the line image and slowly peeled off. The image after peeling was observed visually and with a microscope, and the number of defects was evaluated as an evaluation criterion. The smaller the number of defects, the better the adhesion to the paper. The evaluation results are shown in Table 5. If the number of defects is 5 or less, it is determined that the effect of the present disclosure is obtained.

Evaluation 3 Fixing Performance Evaluation 3 (Toner Scattering Property: Density Unevenness after Fixing)

The evaluation was carried out in an environment of 23° C. and 50% RH. As the medium, A4 color laser copy paper (manufactured by Canon Inc., 70 g/m$^2$) was used. As the image forming apparatus, a commercially available LBP-3100 (manufactured by Canon) modified by changing the printing speed from 16 sheets/min to 40 sheets/min and removing the fixing device was used. Further, for fixing the unfixed image, a modified fixing device in which the fixing unit was modified so that the fixing temperature could be adjusted was used.

Using the image forming apparatus, the toner laid-on level on the paper was adjusted to 9 g/m$^2$, and then a solid black image was printed in an unfixed state, and the unfixed image was fixed using the modified fixing device. The image density of the fixed image at 10 randomly selected points was measured, the lowest measured value was subtracted from the highest measured value obtained, and the difference in density in percentage was evaluated. The smaller the difference in density, the more the toner scattering was suppressed, and it was determined that the performance was excellent. The density was measured using a Macbeth reflection densitometer (manufactured by Macbeth Co.). Where the density difference was 5.0% or less, it was determined that the effect of the present disclosure was obtained.

Example 2

The evaluation was performed in the same manner as in Example 1, except that the image forming apparatus was replaced with HP LaserJet Enterprise M653x modified in the same manner as the LBP-3100 used in Example 1, and the toner was changed as shown in Table 5.

Examples 3 to 9

The evaluation was performed in the same manner as in Example 1, except that the toner was changed as shown in Table 5.

Example 10

The evaluation was performed in the same manner as in Example 1, except that the image forming apparatus was replaced with color copying machine iRC-3200 (manufactured by Canon Inc.) modified in the same manner as the LBP-3100 used in Example 1, and the toner was changed as shown in Table 5.

Examples 11 to 18

The evaluation was performed in the same manner as in Example 1, except that the toner was changed as shown in Table 5.

Comparative Examples 1 to 3

The evaluation was performed in the same manner as in Example 1, except that the toner was changed as shown in Table 6.

Comparative Examples 4 and 5

The evaluation was performed in the same manner as in Example 1, except that the image forming apparatus was replaced with HP LaserJet Enterprise M653x modified in the same manner as the LBP-3100 used in Example 1, and the toner was changed as shown in Table 6.

Comparative Examples 6 and 7

The evaluation was performed in the same manner as in Example 1, except that the toner was changed as shown in Table 6.

Comparative Example 8

The evaluation was performed in the same manner as in Example 1, except that the image forming apparatus was replaced with color copying machine iRC-3200 (manufactured by Canon Inc.) modified in the same manner as the LBP-3100 used in Example 1, and the toner was changed as shown in Table 6.

TABLE 5

| Example | Toner No. | Evaluation 1 Fixing performance evaluation Low-temperature fixability Fixing temperature (° C.) | Evaluation 2 Fixing performance evaluation Adhesion to paper Number of defects (number) | Evaluation 3 Fixing performance evaluation Toner scattering property Difference in density (%) |
|---|---|---|---|---|
| Example 1 | Toner 1 | 180 | 0 | 2.1 |
| Example 2 | Toner 2 | 179 | 0 | 2.0 |
| Example 3 | Toner 3 | 176 | 0 | 3.3 |
| Example 4 | Toner 4 | 174 | 0 | 3.8 |
| Example 5 | Toner 5 | 187 | 1 | 1.8 |
| Example 6 | Toner 6 | 198 | 1 | 1.7 |
| Example 7 | Toner 7 | 181 | 2 | 2.4 |
| Example 8 | Toner 8 | 180 | 4 | 2.2 |
| Example 9 | Toner 9 | 185 | 1 | 2.6 |
| Example 10 | Toner 10 | 186 | 1 | 2.8 |
| Example 11 | Toner 11 | 182 | 0 | 3.5 |
| Example 12 | Toner 12 | 180 | 0 | 4.5 |
| Example 13 | Toner 13 | 192 | 2 | 1.8 |
| Example 14 | Toner 14 | 203 | 3 | 1.5 |
| Example 15 | Toner 15 | 194 | 5 | 1.4 |
| Example 16 | Toner 16 | 183 | 0 | 4.8 |
| Example 17 | Toner 17 | 197 | 0 | 2.7 |
| Example 18 | Toner 18 | 204 | 0 | 2.8 |

TABLE 6

| Comparative Example | Toner No. | Evaluation 1 Fixing performance evaluation Low-temperature fixability Fixing temperature (°C) | Evaluation 2 Fixing performance evaluation Adhesion to paper Number of defects (number) | Evaluation 3 Fixing performance evaluation Toner scattering property Difference in density (%) |
|---|---|---|---|---|
| Comparative Example 1 | Toner 19 | 208 | 8 | 2.6 |
| Comparative Example 2 | Toner 20 | 177 | 0 | 6.5 |
| Comparative Example 3 | Toner 21 | 207 | 9 | 2.8 |
| Comparative Example 4 | Toner 22 | 216 | 10 | 2.1 |
| Comparative Example 5 | Toner 23 | 209 | 8 | 2.3 |

TABLE 6-continued

| Comparative Example | Toner No. | Evaluation 1 Fixing performance evaluation Low-temperature fixability Fixing temperature (°C) | Evaluation 2 Fixing performance evaluation Adhesion to paper Number of defects (number) | Evaluation 3 Fixing performance evaluation Toner scattering property Difference in density (%) |
|---|---|---|---|---|
| Comparative Example 6 | Toner 24 | 207 | 9 | 2.6 |
| Comparative Example 7 | Toner 25 | 210 | 9 | 2.8 |
| Comparative Example 8 | Toner 26 | 206 | 7 | 2.6 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2021-071560, filed Apr. 21, 2021, which is hereby incorporated by reference herein in its entirety.

What is claimed is:

1. A toner, comprising:
a toner particle having a core-shell structure comprising a core and a shell covering the core, a thickness of the shell being 100 to 200 nm in a cross section of the toner observed with a transmission electron microscope;
the core comprising a styrene-acrylic resin and a crystalline material;
the crystalline material being an ester wax in an amount of 5.00 to 50.00 parts by mass with respect to 100 parts by mass of the styrene-acrylic resin; and
the shell comprising an amorphous polyester resin within 100 nm from a surface of the toner particle, a content ratio of a monomer unit represented by formula (B) in the amorphous polyester resin being 30.0 to 50.0% by mass with respect to the mass of the amorphous polyester resin, a content ratio of a monomer unit represented by formula (C) in the amorphous polyester resin being 25.0 to 50.0% by mass with respect to the mass of the amorphous polyester resin, and a content ratio of a monomer unit represented by formula (D) in the amorphous polyester resin being 1.0 to 50.0% by mass with respect to the mass of the amorphous polyester resin

(B)

(C)

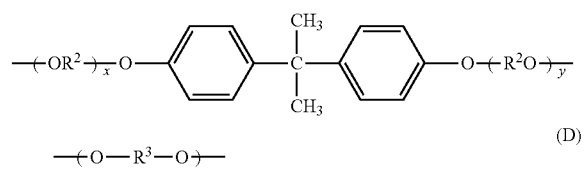

(D)

where $R^1$ represents a benzene ring, $R^2$ represents an ethylene or a propylene group, x and y are each an integer of 1 or more and an average value of x+y is 2 to 10, and $R^3$ represents an ethylene or a propylene group, wherein
the toner has a softening point determined by a constant-load extrusion type capillary rheometer of 150° C. or less,
where a value obtained by dividing an amount of counted ions for a structure represented by formula (A) measured from the surface of the toner particle to a depth of 100 nm by time-of-flight secondary ion mass spectrometry by a total amount of counted ions is taken as a standard value $$-\mathrm{O}-\overset{\mathrm{O}}{\underset{\|}{\mathrm{C}}}-, \quad (A)$$

one or more peaks of the standard value are present within a range of 100 nm from the surface of the toner particle, and $1.15 \leq A(d\max)/A(0) \leq 5.00$ and $0.010 \leq A(0)$ where A(dmax) is a standard value of a peak having a maximum standard value among the one or more present peaks and A(0) is a standard value on the toner particle surface.

2. The toner according to claim 1, wherein $1.15 \leq A(d\max)/A(100) \leq 5.00$ when A(100) is a standard value at a position at a depth of 100 nm from the surface of the toner particle from among the standard values.

3. The toner according to claim 1, wherein the polyester resin has a dielectric loss tangent of 0.0070 to 0.0140 at 25° C. and 10,000 Hz.

4. The toner according to claim 1, wherein $0.010 \leq A(0) \leq 0.100$.

5. The toner according to claim 1, wherein $0.010 \leq A(100) \leq 0.100$.

6. The toner according to claim 1, wherein at least two peaks are obtained when acetonitrile is used as a poor solvent and chloroform is used as a good solvent for a chloroform-soluble component of the polyester resin, and a component eluted during a linear change from a mobile phase composition of 100% by mass of acetonitrile to a mobile phase composition of 100% by mass of chloroform is analyzed by gradient polymer elution chromatography, and
$0.40 \leq S(2)/S(1) < 1.00$ when S(1) is a standard value of the peak showing a maximum peak intensity among the two or more peaks and S(2) is a standard value of the peak showing a second largest peak intensity.

7. The toner according to claim 1, wherein the amount of the polyester resin is 1.0 to 10.0 parts by mass with respect to 100 parts by mass of the styrene-acrylic resin.

8. The toner according to claim 1, wherein in the cross section of the toner observed with a transmission electron microscope:
- an average number of domains of the ester wax is 8 to 500,
- a number average diameter of major axes of the domains of the ester wax is 50 to 300 nm, and
- a proportion of the domains present in a region of 25% or less of a distance between a contour and a geometric center of the cross section from the contour of the cross section is 60 to 100% by number with respect to a total number of domains present in the cross section.

9. The toner according to claim 1, wherein the ester wax is a condensate of stearic acid and stearyl alcohol.

* * * * *